(12) United States Patent
Goto et al.

(10) Patent No.: US 8,721,979 B2
(45) Date of Patent: May 13, 2014

(54) HONEYCOMB STRUCTURE AND EXHAUST GAS PURIFYING APPARATUS

(75) Inventors: Shigeaki Goto, Ibi-gun (JP); Toyoki Ogasawara, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 323 days.

(21) Appl. No.: 13/343,235

(22) Filed: Jan. 4, 2012

(65) Prior Publication Data
US 2012/0251402 A1 Oct. 4, 2012

(30) Foreign Application Priority Data

Mar. 31, 2011 (WO) .................. PCT/JP2011/058333

(51) Int. Cl.
*B01D 50/00* (2006.01)
(52) U.S. Cl.
USPC .......................................... 422/180; 422/177
(58) Field of Classification Search
CPC .................................................. B01D 46/2474
USPC ..................................... 422/180, 177; 55/523
See application file for complete search history.

(56) References Cited

U.S. PATENT DOCUMENTS

| 6,843,822 | B2 * | 1/2005 | Beall et al. ....................... 55/523 |
| 2006/0269722 | A1 | 11/2006 | Yamada | |

FOREIGN PATENT DOCUMENTS

| EP | 1676620 A1 * | 7/2006 |
| EP | 2108447 | 10/2009 |
| EP | 2343113 | 7/2011 |
| JP | 60-141667 | 7/1985 |
| JP | 9-125931 | 5/1997 |
| JP | 2002-201933 | 7/2002 |
| JP | 2003-515023 | 4/2003 |
| JP | 2004-000896 | 1/2004 |
| JP | 2006-25574 | 1/2006 |

* cited by examiner

*Primary Examiner* — Tom Duong
(74) *Attorney, Agent, or Firm* — Ditthavong Mori & Steiner, P.C.

(57) ABSTRACT

A honeycomb structure includes a ceramic block including a plurality of honeycomb fired bodies. Each of the plurality of honeycomb fired bodies includes large volume cells and small volume cells. Either one of the end portions of each of the large volume cells and the small volume cells is plugged. An aperture in the cross section in a central part of the honeycomb structure is about 65% or more. A ratio of an aperture of the first end face to an aperture of the second end face of the honeycomb structure is about 1.4 or more. Each of the cell walls except the peripheral walls has a thickness of about 0.1 mm to about 0.2 mm. The honeycomb structure has a diameter of about 200 mm or more. A ratio of a length to the diameter of the honeycomb structure is about 1.0 or less.

40 Claims, 13 Drawing Sheets

A-A line cross-sectional view

B-B line cross-sectional view

C-C line cross-sectional view

HONEYCOMB STRUCTURE AND EXHAUST GAS PURIFYING APPARATUS

CROSS-REFERENCE TO RELATED APPLICATIONS

The present application claims priority under 35 U.S.C. §119 to International Application No. PCT/JP2011/058333 filed on Mar. 31, 2011, the contents of which are incorporated herein by reference in their entirety.

BACKGROUND OF THE INVENTION

1. Field of the Invention

The present invention relates to a honeycomb structure and an exhaust gas purifying apparatus.

2. Discussion of the Background

In recent years, particulates (hereinafter, also referred to as "PM") such as soot and other toxic components contained in exhaust gases discharged from internal combustion engines of vehicles such as buses and trucks, construction machines, or the like have raised serious problems as contaminants harmful to the environment and the human body.

For this reason, various honeycomb structures made of porous ceramics have been proposed as honeycomb filters to purify (convert) the exhaust gases.

Conventionally-known honeycomb structures as above described include a honeycomb structure having a ceramic block including a combination of multiple honeycomb fired bodies in each of which a large number of cells are longitudinally disposed in parallel with one another with a cell wall interposed therebetween.

JP-A 2006-25574 discloses a honeycomb structure that can secure sufficient capture efficiency even when a cell wall is made thin in order to keep low pressure loss of the honeycomb structure.

Specifically, a conventional honeycomb structure disclosed in JP-A 2006-25574 satisfies the equation $11/6-10/3 \times A \leq B$ provided that the thickness of a cell wall is A (mm) and the surface area of the cell wall per unit volume is B (m$^2$/cm$^3$).

JP-A 60-141667 discloses a ceramic honeycomb structure material useful as a coating material or an impregnating material in order to improve the strength and airtightness of a ceramic honeycomb structure. JP-A 60-141667 specifically discloses a rotary heat storage type ceramic heat exchanger having high heat exchanger effectiveness and low pressure loss.

The contents of JP-A 2006-25574 and JP-A 60-141667 are incorporated herein by reference in their entirety.

SUMMARY OF THE INVENTION

According to one aspect of the present invention, a honeycomb structure includes a ceramic block including a plurality of honeycomb fired bodies. Each of the plurality of honeycomb fired bodies has a peripheral wall and is combined with one another by interposing an adhesive layer. Each of the plurality of honeycomb fired bodies includes large volume cells and small volume cells which have cell walls. Each of the large volume cells is larger than each of the small volume cells in a cross section perpendicular to a longitudinal direction of the honeycomb structure. Each of the large volume cells and the small volume cells has end portions in the longitudinal direction and either one of the end portions of each of the large volume cells and the small volume cells is plugged. An aperture in the cross section perpendicular to the longitudinal direction in a central part of the honeycomb structure is about 65% or more. The honeycomb structure has a first end face and a second end face in the longitudinal direction and a ratio of an aperture of the first end face of the honeycomb structure to an aperture of the second end face of the honeycomb structure (aperture of the first end face/aperture of the second end face) is about 1.4 or more. Each of the cell walls except the peripheral walls of the plurality of honeycomb fired bodies has a thickness of about 0.1 mm or more, and less than about 0.2 mm. The honeycomb structure has a diameter of about 200 mm or more. A ratio of a length of the honeycomb structure to the diameter of the honeycomb structure (length of the honeycomb structure/diameter of the honeycomb structure) is about 1.0 or less.

According to another aspect of the present invention, an exhaust gas purifying apparatus includes a honeycomb structure, a holding sealing material disposed on a side face of the honeycomb structure, and a metal container. The honeycomb structure and the holding sealing material are disposed in the metal container. The honeycomb structure includes comprising a ceramic block including a plurality of honeycomb fired bodies. Each of the plurality of honeycomb fired bodies has a peripheral wall and is combined with one another by interposing an adhesive layer. Each of the plurality of honeycomb fired bodies includes large volume cells and small volume cells which have cell walls. Each of the large volume cells is larger than each of the small volume cells in a cross section perpendicular to a longitudinal direction of the honeycomb structure. Each of the large volume cells and the small volume cells has end portions in the longitudinal direction and either one of the end portions of each of the large volume cells and the small volume cells is plugged. An aperture in the cross section perpendicular to the longitudinal direction in a central part of the honeycomb structure is about 65% or more. The honeycomb structure has a first end face and a second end face in the longitudinal direction and a ratio of an aperture of the first end face of the honeycomb structure to an aperture of the second end face of the honeycomb structure (aperture of the first end face/aperture of the second end face) is about 1.4 or more. Each of the cell walls except the peripheral walls of the plurality of honeycomb fired bodies has a thickness of about 0.1 mm or more, and less than about 0.2 mm. The honeycomb structure has a diameter of about 200 mm or more. A ratio of a length of the honeycomb structure to the diameter of the honeycomb structure (length of the honeycomb structure/ diameter of the honeycomb structure) is about 1.0 or less. The honeycomb structure is disposed so that an exhaust gas inlet side corresponds to the first end face of the honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
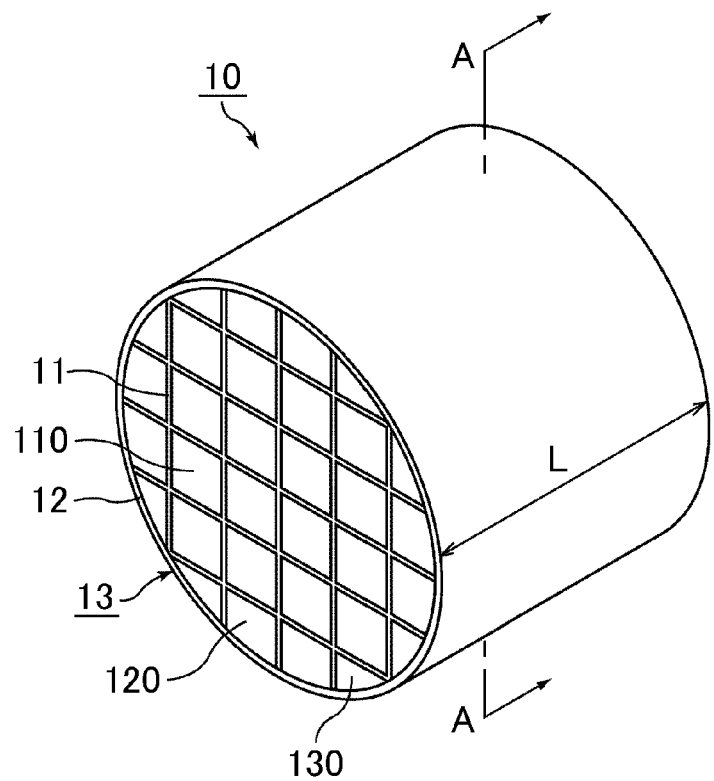
FIG. 1A is a perspective view schematically illustrating one example of a honeycomb structure according to a first embodiment of the present invention.

Honeycomb filters whose volumes are smaller than before have been recently required in order to secure an installation location at the bottom of vehicles in large honeycomb filters used for large vehicles such as buses and trucks.

However, if the volume of the honeycomb filter is small, the pressure loss of the honeycomb filter increases. Therefore, thinner cell walls in the honeycomb filter (formation of thinner walls) are required so as to suppress the increase in pressure loss of a honeycomb filter and improve exhaust gas purifying performance.

In embodiments of the present invention, it is allowed to be used for large vehicles or the like, to reduce the volume of the honeycomb structure, and to provide a honeycomb structure having high strength and low pressure loss. In embodiments of the present invention, it is also allowed to provide an exhaust gas purifying apparatus including the honeycomb structure.

A honeycomb structure according to the embodiment of the present invention includes:

a ceramic block in which multiple honeycomb fired bodies are combined with one another by interposing an adhesive layer, each of the multiple honeycomb fired bodies including large volume cells and small volume cells, each of the large volume cells being larger than each of the small volume cells in a cross section perpendicular to the longitudinal direction, wherein either one end portion of each of the large volume cells and the small volume cells is plugged, an aperture in a cross section perpendicular to the longitudinal direction in a central part of the honeycomb structure is about 65% or more, a ratio of an aperture of a first end face of the honeycomb structure to an aperture of the second end face of the honeycomb structure (aperture of the first end face/aperture of the second end face) is about 1.4 or more, a cell wall except a peripheral wall of the honeycomb fired body has a thickness of about 0.1 mm or more, and less than about 0.2 mm, the honeycomb structure has a diameter of about 200 mm or more, and a ratio of a length of the honeycomb structure to the diameter of the honeycomb structure (length of the honeycomb structure/diameter of the honeycomb structure) is about 1.0 or less.

In the case where the honeycomb structure is used for large vehicles or the like, if the volume of the honeycomb structure is large, the entire exhaust gas purifying apparatus tends to be large. In this case, it is necessary to reduce the volume of the honeycomb structure. Then, in the honeycomb structure having a diameter of about 200 mm or more, when (a) the ratio of the length of the honeycomb structure to the diameter of the honeycomb structure (length of the honeycomb structure/diameter of the honeycomb structure) is about 1.0 or less, (b) the ratio of the aperture of the first end face of the honeycomb structure to the aperture of the second end face of the honeycomb structure (aperture of the first end face/aperture of the second end face) is about 1.4 or more, (c) a cell wall except a peripheral wall of the honeycomb fired body has a thickness of about 0.1 mm or more, and less than about 0.2 mm, and (d) the aperture in a cross section perpendicular to the longitudinal direction in the central part of the honeycomb structure is about 65% or more, the volume of the obtained honeycomb structure is more likely to be reduced, the strength thereof is more likely to be increased, and the pressure loss thereof is more likely to be decreased.

Specifically, if the ratio of the length to the diameter of the honeycomb structure (length of the honeycomb structure/diameter of the honeycomb structure) is about 1.0 or less, the volume of the honeycomb structure is more likely to be reduced.

Further, if the ratio of the aperture of the first end face of the honeycomb structure to the aperture of the second end face of the honeycomb structure is about 1.4 or more, and the thickness of the cell wall is about 0.1 mm or more, and less than about 0.2 mm, the aperture in a cross section perpendicular to the longitudinal direction in the central part of the honeycomb structure tends to be about 65% or more. The increase in aperture in a cross section perpendicular to the longitudinal direction in the central part of the honeycomb structure is generally considered to lead to the decrease in filtration area. However, since the cell wall is thin, the filtration area is more likely to be increased, even in the case where the aperture in a cross section perpendicular to the longitudinal direction in the central part of the honeycomb structure is as high as about 65% or more. Therefore, the pressure loss of the honeycomb structure is more likely to be reduced. In the case where the honeycomb structure containing (a) to (d) described above is used for large vehicles or the like, the volume of the honeycomb structure is more likely to be reduced, the strength thereof is more likely to be increased, and the pressure loss thereof is more likely to be decreased.

If the honeycomb structure according to the embodiment of the present invention does not satisfy at least one of (a) to (d) described above, it may not become easier to achieve a small volume of the honeycomb structure. It may also not become easier to achieve high strength and low pressure loss of the honeycomb structure.

In the honeycomb structure according to the embodiment of the present invention, since the aperture in a cross section perpendicular to the longitudinal direction in the central part of the honeycomb structure is as high as about 65% or more, the (initial) pressure loss before PM deposition is more likely to be reduced.

In the case where the honeycomb structure is used for large vehicles or the like as a honeycomb filter, since large vehicles are often continuously driven, the exhaust temperature of exhaust gases tends to be high. Therefore, PM in exhaust gases need not be forcibly combusted after deposited in a large amount in the honeycomb structure, and is more likely to be continuously combusted. Therefore, in such a honeycomb structure, it is important that the (initial) pressure loss before PM deposition can be lower than the pressure loss after PM deposition. As described above, in the honeycomb structure according to the embodiment of the present invention, the (initial) pressure loss before PM deposition is more likely to be reduced.

In the honeycomb structure according to the embodiment of the present invention, the ratio of the aperture of the first end face of the honeycomb structure to the aperture of the second end face of the honeycomb structure (also referred to as "aperture ratio" (aperture of the first end face/aperture of the second end face)) is about 1.4 or more, the cell wall is as thin as about 0.1 mm or more, and less than about 0.2 mm. Therefore, the filtration area is more likely to be increased, and simultaneously the above-described high aperture is more likely to be achieved.

The cell wall of a honeycomb structure needs to be thinner in order to set the ratio of the aperture of the honeycomb structure (aperture of the first end face/aperture of the second end face) to less than about 1.4, and set the aperture in a cross section perpendicular to the longitudinal direction in the central part of the honeycomb structure to about 65% or more. In this case, mechanical properties easily deteriorate (the strength of the cell wall decreases), or the cell density needs to be lowered, easily leading to increase in pressure loss and reduction in capture efficiency. That is, since the cell wall of the honeycomb structure having a thickness of about 0.1 mm or more is not too thin, the mechanical strength of the honeycomb structure tends not to be reduced, and cracks and the like tend not to occur upon regeneration and the like in the honeycomb structure.

In contrast, since the cell wall of the honeycomb structure having a thickness of less than about 0.2 mm is not too thick, it may become easier to keep low pressure loss of the honeycomb structure.

The expression "the aperture on an end face of the honeycomb structure" refers to a ratio (%) of the area of portions which include cells (openings) not plugged and whose end faces are open to the total area of the end faces of the honeycomb structure.

The expression "the aperture in a cross section perpendicular to the longitudinal direction in the central part of the honeycomb structure" refers to an aperture in a cross section midway between both ends parallel to both end faces of the honeycomb structure. The expression "the cross section perpendicular to the longitudinal direction in the central part of the honeycomb structure" refers to a cross section not including a plug material. The expression "the aperture in a cross section perpendicular to the longitudinal direction in the central part of the honeycomb structure" refers to a ratio (percentage) of the total area of open portions (cells) to the total area of the above-described cross section.

The expression "the central part of the honeycomb structure" used in the embodiments of the present invention refers to an intermediate position between both ends parallel to both end faces of the honeycomb structure. Further, the expression "the longitudinal direction of the honeycomb structure" used in the embodiments of the present invention refers to a direction parallel to cells.

The honeycomb structure according to the embodiment of the present invention has a diameter of about 200 mm or more, and the ratio of the length of the honeycomb structure to the diameter of the honeycomb structure (also referred to as the ratio of the length to the diameter of the honeycomb structure (length of the honeycomb structure/diameter of the honeycomb structure)) is about 1.0 or less. That is, the honeycomb structure according to the embodiment of the present invention is a large honeycomb structure used for large vehicles or the like, the diameter of the honeycomb structure is large, and the length of the honeycomb structure is shorter than the diameter of a honeycomb structure. Therefore, the area of the end faces of the honeycomb structure tends to be large, and the length of the cell tends to be short. Consequently, the increase in pressure loss of the honeycomb structure caused by friction arising when exhaust gas passes through the cells of the honeycomb structure is more likely to be suppressed. In the case where the area of the end faces of the honeycomb structure is large and the length of the cell is short, the cell wall is thin, which makes it easier to suppress the increase in pressure loss of the honeycomb structure. In addition, contribution of the increase in pressure loss of the honeycomb structure is considered to be reduced even if the flow speed of exhaust gases that pass through the cell walls is high. Further, PM tends to be substantially uniformly deposited on the entire cell of the honeycomb structure. Thus, when the length of the honeycomb structure is shorter than the diameter of the honeycomb structure, the pressure loss of the honeycomb structure is more likely to be reduced. Therefore, the volume of the honeycomb structure is more likely to be reduced. In the case where the honeycomb structure is used for large vehicles or the like, continuous regeneration (removal of PM) of the honeycomb structure makes it unnecessary to deposit a large amount of PM on the honeycomb structure.

In the case where the honeycomb structure is used as a filter, it is necessary to fulfill the conditions such as a predetermined filtration area. Therefore, if the honeycomb structure has a diameter of less than about 200 mm, the length of the honeycomb structure/the diameter of the honeycomb structure is considered to tend to exceed about 1.0. Accordingly, the pressure loss of the honeycomb structure tends to be high. If the ratio of the length to the diameter of the honeycomb structure exceeds about 1.0, the length of the honeycomb structure is larger than the diameter thereof, likely leading to a high pressure loss of the honeycomb structure.

In the present description, the expression "a cell wall in the honeycomb fired body" refers to a portion that is present between adjacent two cells to separate the two cells. The expression "a peripheral wall of the honeycomb fired body" refers to a wall that is formed in the outermost periphery of the honeycomb fired body so that the cell wall is not exposed to the periphery.

In the honeycomb structure according to the embodiment of the present invention, the aperture in a cross section perpendicular to the longitudinal direction in the central part of the honeycomb structure is desirably about 80% or less. In this case, the number of the cells present per unit area of the honeycomb structure is more likely to be set to a suitable number (for example, from about 31 pcs/cm$^2$ to about 62 pcs/cm$^2$). Accordingly, the cell wall functions as a wall supporting the honeycomb structure, and the mechanical strength of the honeycomb structure is more likely to be maintained within a suitable range.

In the honeycomb structure according to the embodiment of the present invention, the aperture ratio (aperture of the first end face/aperture of the second end face) is desirably about 3.0 or less. In this case, it may become easier to suppress the increase in pressure loss of the exhaust gas purifying apparatus resulting from too high a ratio of the aperture of the first end face of the honeycomb structure to the aperture of the second end face thereof. Namely, if the difference in volumes of the large volume cells and the small volume cells in the honeycomb structure is large, the area of the cell wall that partitions the large volume cells and the small volume cells is small. It presumably follows that the area of the wall out of which exhaust gases that have flowed into the honeycomb structure flow tends to decrease, and the pressure loss of the honeycomb structure tends to increase. However, in the honeycomb structure according to the embodiment of the present invention, if the aperture ratio of the honeycomb structure is about 3.0 or less, the area of the cell wall that partitions the large volume cells and the small volume cells tends not to be small. Therefore, the area of the wall out of which exhaust gases that have flowed into the honeycomb structure flow tends not to decrease, and the pressure loss of the honeycomb structure tends not to increase.

In the honeycomb structure according to the embodiment of the present invention, the ratio of the length of the honeycomb structure to the diameter of the honeycomb structure (length of the honeycomb structure/diameter of the honeycomb structure) is desirably about 0.5 or more.

If the ratio of the length to the diameter of the honeycomb structure is too low, less than about 0.5, exhaust gases that have flowed into the honeycomb structure tend to flow backward (exhaust gas outlet side). Therefore, PM is more likely to be accumulated only on the exhaust gas outlet side of the honeycomb structure. As a result, the pressure loss of the honeycomb structure tends to increase. However, in the honeycomb structure according to the embodiment of the present invention, if the ratio of the length of the honeycomb structure to the diameter of the honeycomb structure is about 0.5 or more, exhaust gases that have flowed into the honeycomb structure tends not to flow backward (exhaust gas outlet side). Therefore, PM tends to be substantially uniformly deposited on the cell wall of the honeycomb structure. As a result, the pressure loss of the honeycomb structure tends not to increase.

In the honeycomb structure according to the embodiment of the present invention, the peripheral wall has desirably a thickness of from about 0.2 mm to about 0.5 mm in each of the honeycomb fired bodies. In this case, the peripheral wall is thicker than the cell wall of the honeycomb structure. Therefore, even if the cell wall of the honeycomb fired body is thin, the peripheral wall of the honeycomb fired body can function as a reinforcing material for maintaining mechanical strength, and mechanical properties of the honeycomb fired body are more likely to be favorably maintained.

If the peripheral wall of the honeycomb fired body has a thickness of less than about 0.2 mm, the peripheral wall of the honeycomb fired body tends not to function as a reinforcing material for maintaining mechanical strength, and the mechanical strength of the honeycomb fired body tends not to be secured. In contrast, if the peripheral wall of the honeycomb fired body has a thickness of more than about 0.5 mm, the rate of the peripheral wall in the area of the end face of the honeycomb structure becomes too large. Consequently, it is difficult to keep the aperture in a cross section perpendicular to the longitudinal direction in the central part of the honeycomb structure about 65% or more.

In the honeycomb structure according to the embodiment of the present invention, the number of cells per unit area in a cross section perpendicular to the longitudinal direction of the honeycomb fired body is desirably from about 31 pcs/cm$^2$ to about 62 pcs/cm$^2$ (from about 200 pcs/inch$^2$ to about 400 pcs/inch$^2$). In this case, the number (area) of the cell walls per unit area in the cross section of the honeycomb structure is within a suitable range, the cell wall can function as a site for maintaining mechanical properties of the honeycomb fired body, and the honeycomb structure tends to maintain mechanical properties.

If the number of cells per unit area in a cross section perpendicular to the longitudinal direction of the honeycomb fired body is less than about 31 pcs/cm$^2$, the number of cells per unit area in a cross section of the honeycomb fired body is too small, and therefore mechanical properties of the honeycomb fired body tend to deteriorate.

In contrast, if the number of cells per unit area in a cross section perpendicular to the longitudinal direction of the honeycomb fired body exceeds about 62 pcs/cm$^2$, the number of cells per unit area in a cross section thereof is too large. Therefore, it is difficult to set the aperture in a cross section perpendicular to the longitudinal direction in the central part of the honeycomb structure to about 65% or more.

In the embodiments of the present invention, the expression "mechanical properties of the honeycomb fired body" refers to bending strength, tensile strength, compressive strength, fracture toughness, and the like properties of a honeycomb fired body. It is desirable to maintain compressive strength among these mechanical properties.

In the honeycomb structure according to the embodiment of the present invention, each of the large volume cells may have a substantially octagonal shape in a cross section perpendicular to the longitudinal direction, and each of the small volume cells may have a substantially quadrangle shape in a cross section perpendicular to the longitudinal direction.

In the honeycomb structure according to the embodiment of the present invention, each of the large volume cells may have a substantially quadrangle shape in a cross section perpendicular to the longitudinal direction, and each of the small volume cells may have a substantially quadrangle shape in a cross section perpendicular to the longitudinal direction.

In the honeycomb structure according to the embodiment of the present invention, each side in each of the large volume cells and the small volume cells may have a shape formed by a curve line in a cross section perpendicular to the longitudinal direction.

In the honeycomb structure according to the embodiment of the present invention, the ceramic block desirably includes honeycomb fired bodies each having a peripheral wall in an entire periphery.

When the ceramic block includes honeycomb fired bodies combined with one another by interposing an adhesive layer and each having a predetermined shape and having a peripheral wall in an entire periphery, cutting for forming the peripheral portion of the honeycomb structure is unnecessary, and therefore the honeycomb structure is more likely to be manufactured.

An exhaust gas purifying apparatus according to the embodiment of the present invention includes
a honeycomb structure,
a holding sealing material being disposed on a side face of the honeycomb structure, and
a metal container,
the honeycomb structure being the honeycomb structure according to the embodiments of the present invention,
the honeycomb structure and the holding sealing material being disposed in the metal container, and
the honeycomb structure being disposed so that an exhaust gas inlet side corresponds to a first end face of the honeycomb structure.

The honeycomb structure according to the embodiments of the present invention is disposed in the exhaust gas purifying apparatus according to the embodiment of the present invention, and the volume of the honeycomb structure is more likely to be reduced. Therefore, the exhaust gas purifying apparatus itself is more likely to be miniaturized.

The honeycomb structure tends to have high strength. Thus, it may become easier to manufacture an exhaust gas purifying apparatus that tends not to cause cracks in the honeycomb structure over long periods of use and excels in durability.

Further, since the (initial) pressure loss before PM deposition of the honeycomb structure tends to be low, it may become easier to manufacture an exhaust gas purifying apparatus with a low initial pressure loss.

As described above, conventionally, thinner cell walls in the honeycomb filter (formation of thinner walls) are required so as to suppress the increase in pressure loss of a honeycomb filter and improve exhaust gas purifying performance.

A conventional honeycomb structure described in JP-A 2006-25574 has been presumably proposed in order to respond to such requests. Even in the case where the cell walls are thin in the conventional honeycomb structure described in JP-A 2006-25574, the capture efficiency of PM is considered to be secured by controlling the fine structure of the cell walls that facilitates capture of PM.

The cell walls are presumably assumed to have a thickness of 0.1 mm to 0.4 mm in the conventional honeycomb structure described in JP-A 2006-25574. Even in the case where the cell walls are thin, the capture efficiency is presumably secured by controlling the fine structure of the cell walls that facilitates capture of PM. However, thin cell walls are considered to easily lead to reduction in strength of the honeycomb structure.

Even if the pressure loss is more likely to be decreased by reducing the thickness of the cell wall, the strength of the honeycomb structure is considered to be more likely to be reduced. Therefore, it is generally known that the strength of the honeycomb structure having thin cell walls can be increased by decreasing the aperture in a cross section perpendicular to the longitudinal direction in the central part of the honeycomb structure. Thereby, it is considered that a honeycomb structure having low pressure loss and high strength is more likely to be manufactured. In contrast, a large honeycomb structure used for large vehicles or the like is considered to be problematically difficult to use as a honeycomb structure having high strength and low pressure loss.

In the conventional honeycomb structure disclosed in JP-A 60-141667, it is presumably assumed that the partition wall has a thickness of from 0.12 mm to 0.15 mm, and that the ratio of the length of the honeycomb structure to the diameter of the honeycomb structure (length of the honeycomb structure/diameter of the honeycomb structure) is 1.0 or less. In the case where the partition wall is thin, and the ratio of the length of the honeycomb structure to the diameter of the honeycomb structure is 1.0 or less, it is considered that heat exchange efficiency tends to be high and pressure loss tends to be low.

However, in the case where cells have different shapes (for example, the cell shape is a combination of an octagon and a quadrangle) on the inlet side and outlet side of a fluid of a rotary heat storage type ceramic heat exchanger, the pressure loss presumably tends to increase because the rotary heat storage type ceramic heat exchanger is used with PM not deposited therein. In addition, the heat exchange efficiency of the rotary heat storage type ceramic heat exchanger is presumably more likely to be lowered by increasing the aperture and decreasing the area of the cell walls.

The embodiments will now be described with reference to the accompanying drawings, wherein like reference numerals designate corresponding or identical elements throughout the various drawings. However, the present invention is not limited to the following embodiments, and the embodiments may be appropriately changed and applied to the present invention as long as the gist of the present invention are not changed.

First Embodiment

Hereinafter, a first embodiment that is one embodiment of the honeycomb structure of the present invention will be described with reference to drawings.

The honeycomb structure includes:
a ceramic block in which multiple honeycomb fired bodies are combined with one another by interposing an adhesive layer, each of the multiple honeycomb fired bodies including large volume cells and small volume cells, each of the large volume cells being larger than each of the small volume cells in a cross section perpendicular to the longitudinal direction, wherein either one end portion of each of the large volume cells and the small volume cells is plugged,
an aperture in a cross section perpendicular to the longitudinal direction in a central part of the honeycomb structure is about 65% or more,
a ratio of an aperture of a first end face of the honeycomb structure to an aperture of the second end face of the honeycomb structure (aperture of the first end face/aperture of the second end face) is about 1.4 or more,
a cell wall except a peripheral wall of the honeycomb fired body has a thickness of about 0.1 mm or more, and less than about 0.2 mm,
the honeycomb structure has a diameter of about 200 mm or more, and
a ratio of a length of the honeycomb structure to the diameter of the honeycomb structure (length of the honeycomb structure/diameter of the honeycomb structure) is about 1.0 or less.

Hereinafter, a honeycomb fired body located in the periphery of the ceramic block is referred to as "an outer honeycomb fired body", and a honeycomb fired body located inward of the outer honeycomb fired body is referred to as "an inner honeycomb fired body". Both the outer honeycomb fired body and the inner honeycomb fired body are simply referred to as the honeycomb fired body in the case that it is not necessary to distinguish them from each other.

In the present description, simple phrases of a cross section of the honeycomb structure, a cross section of the honeycomb fired body, and a cross section of the honeycomb molded body refer to a cross section perpendicular to the longitudinal direction of the honeycomb structure, a cross section perpendicular to the longitudinal direction of the honeycomb fired body, and a cross section perpendicular to the longitudinal direction of the honeycomb molded body. A simple phrase of a cross section in the central part of the honeycomb structure refers to a cross section perpendicular to the longitudinal direction in the central part of the honeycomb structure. Further, a simple phrase of the cross-sectional area of the honeycomb fired body refers to the area of the cross section perpendicular to the longitudinal direction of the honeycomb fired body.

Figure 1B:
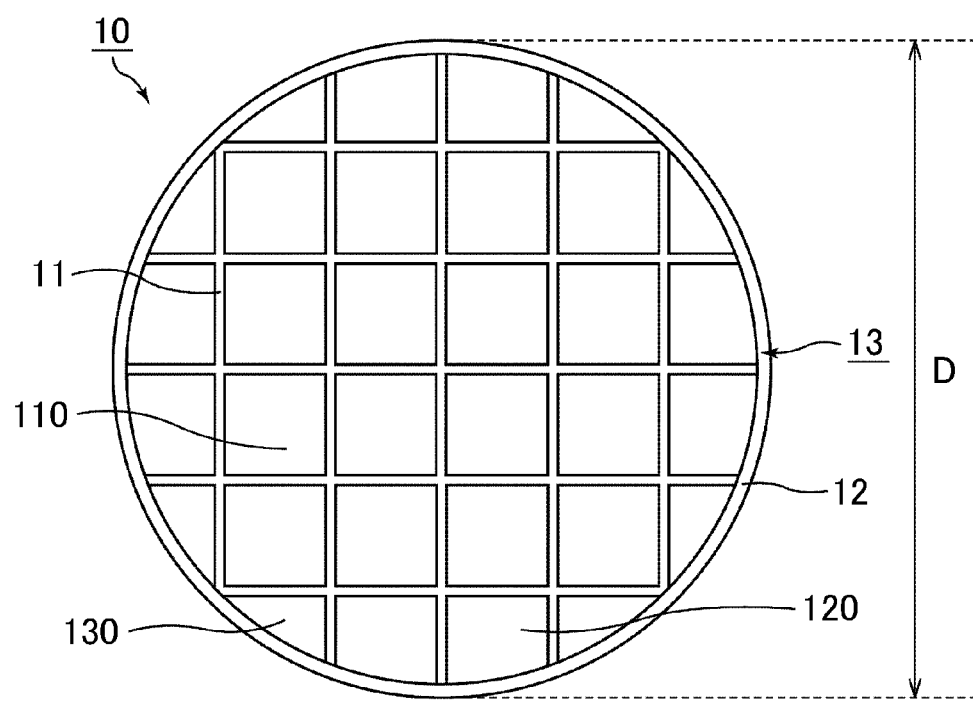
FIG. 1B is an A-A line cross-sectional view of the honeycomb structure illustrated in FIG. 1A.

FIG. 1A is a perspective view schematically illustrating one example of a honeycomb structure according to a first embodiment of the present invention. FIG. 1B is an A-A line cross-sectional view of the honeycomb structure illustrated in FIG. 1A.

In the honeycomb structure 10 illustrated in FIG. 1A and FIG. 1B, multiple honeycomb fired bodies 110, 120, and 130 are combined with one another by interposing adhesive layers 11 to form a ceramic block 13. Additionally, the ceramic block 13 has a peripheral coat layer 12 formed on its periphery. The honeycomb fired bodies 110, 120, and 130 in the honeycomb structure 10, which will be described later, are desirably porous bodies including silicon carbide or silicon-bonded silicon carbide.

The honeycomb structure 10 illustrated in FIG. 1A and FIG. 1B includes 8 pieces of outer honeycomb fired bodies 120, 8 pieces of outer honeycomb fired bodies 130 having shapes different from those of the outer honeycomb fired bodies 120, and 16 pieces of inner honeycomb fired bodies 110. Both of the outer honeycomb fired bodies 120 and 130 are positioned to form the periphery of the ceramic block 13, and the inner honeycomb fired bodies 110 are positioned inward of the honeycomb fired bodies 120 and 130. These 32 pieces of the honeycomb fired bodies are combined with one another by interposing the adhesive layers 11 in a manner such that the ceramic block 13 (the honeycomb structure 10) forms a substantially circular cross-sectional shape.

As illustrated in FIG. 1B, the cross-sectional shape of the inner honeycomb fired body 110 is a substantially quadrangle (a substantially square).

Also, as illustrated in FIG. 1B, the cross-sectional shape of the outer honeycomb fired body 120 is a shape surrounded by three line segments and one substantially arc. Both of the two angles formed by two line segments out of the three line segments are about 90°.

Further, as illustrated in FIG. 1B, the cross-sectional shape of the outer honeycomb fired body 130 is a shape surrounded by two line segments and one substantially arc. The angle formed by the two line segments is about 90°.

Hereinafter, honeycomb fired bodies (inner honeycomb fired bodies and outer honeycomb fired bodies) in the honeycomb structure according to the first embodiment of the present invention will be described with reference to drawings.

First, the inner honeycomb fired body in the honeycomb structure according to the first embodiment of the present invention will be described.

Figure 2A:
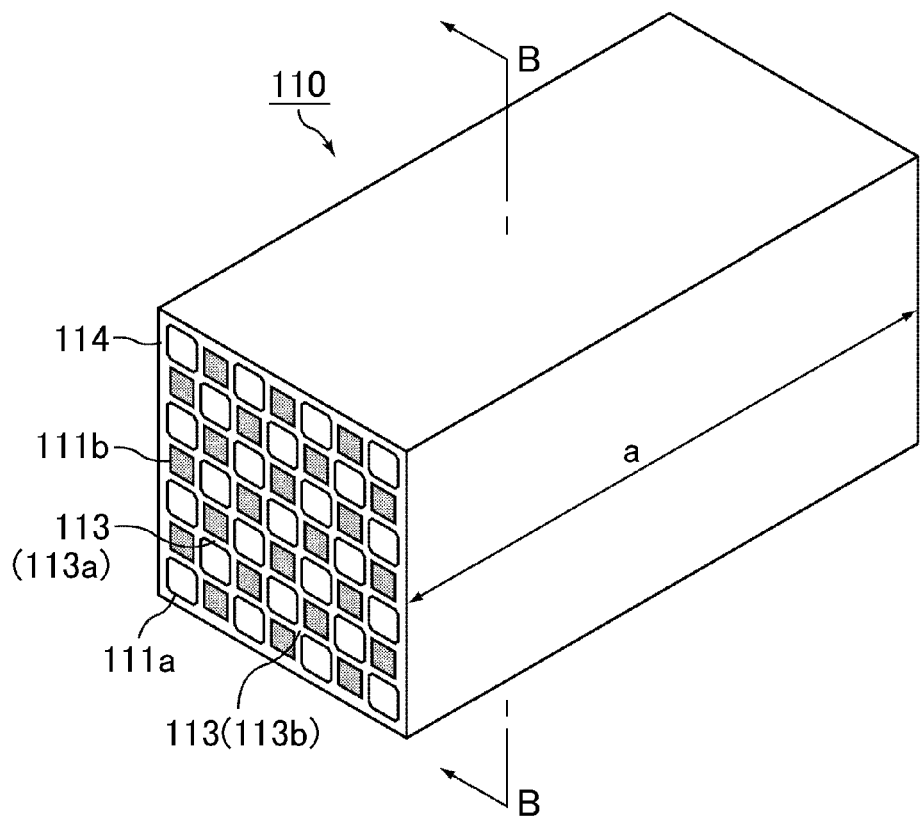
FIG. 2A is a perspective view schematically illustrating one example of an inner honeycomb fired body in the honeycomb structure according to the first embodiment of the present invention.
Figure 2B:
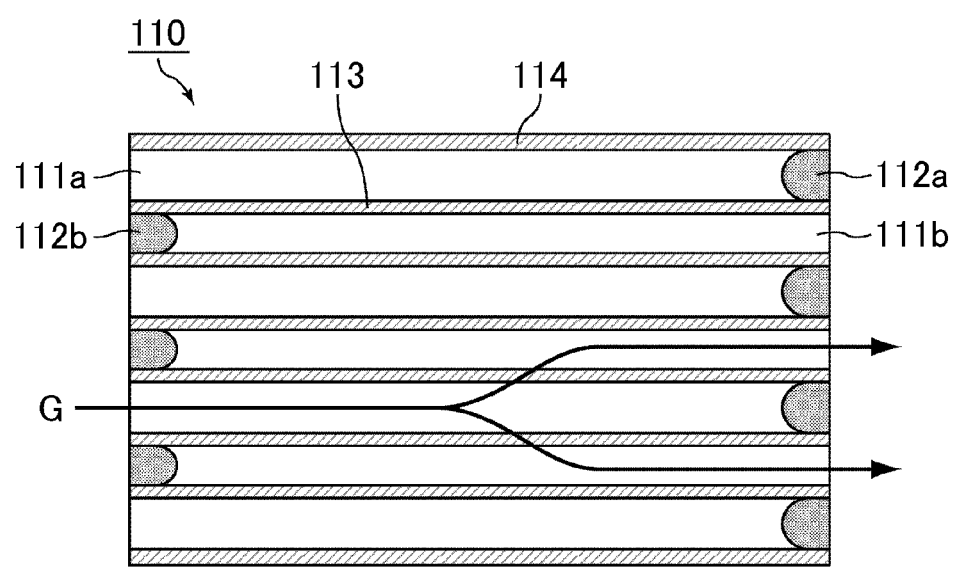
FIG. 2B is a B-B line cross-sectional view of the inner honeycomb fired body illustrated in FIG. 2A.

FIG. 2A is a perspective view schematically illustrating one example of an inner honeycomb fired body in the honeycomb structure according to the first embodiment of the present invention. FIG. 2B is a B-B line cross-sectional view of the inner honeycomb fired body illustrated in FIG. 2A.

An inner honeycomb fired body 110 illustrated in FIG. 2A and FIG. 2B has a large number of large volume cells 111a and small volume cells 111b disposed in parallel with one another in a longitudinal direction (direction of arrow "a" in FIG. 2A) with a cell wall 113 therebetween, and a peripheral wall 114 is formed in the periphery of the inner honeycomb fired body 110. In addition, either one end portion of each of the large volume cells 111a and the small volume cells 111b is plugged with a plug material 112a or 112b.

In the present embodiment, the end portion of each of the small volume cells 111b is plugged with the plug material 112b on an exhaust gas inlet side, and the end portion of each of the large volume cells 111a is plugged with the plug material 112a on an exhaust gas outlet side.

Therefore, exhaust gases G (exhaust gases are indicated by "G" and the flow of the exhaust gases are indicated by arrows in FIG. 2B) which have flowed into one of the large volume cells 111a with an opening on the exhaust gas inlet side surely pass through the cell wall 113 that partitions the large volume cells 111a and the small volume cells 111b, and flow out from the small volume cells 111b with an opening on the exhaust gas outlet side. When the exhaust gases G pass through the cell wall 113, the cell wall 113 captures PM and the like in the exhaust gases. Thus, the cell wall 113 functions as a filter.

Next, an outer honeycomb fired body in the honeycomb structure according to the first embodiment of the present invention will be described.

Figure 3A:
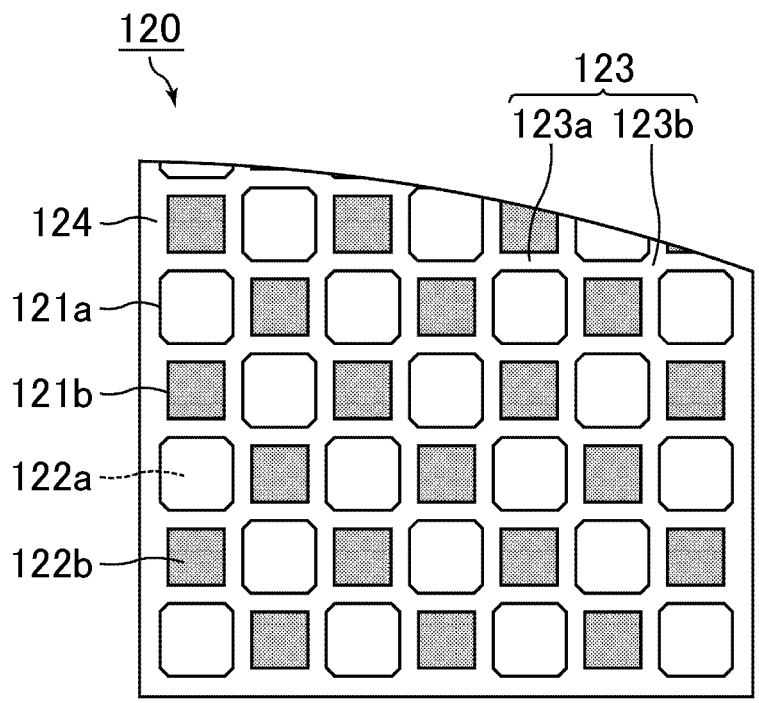
FIG. 3A and FIG. 3B are side views each schematically illustrating one example of an outer honeycomb fired body in the honeycomb structure according to the first embodiment of the present invention.
Figure 3B:
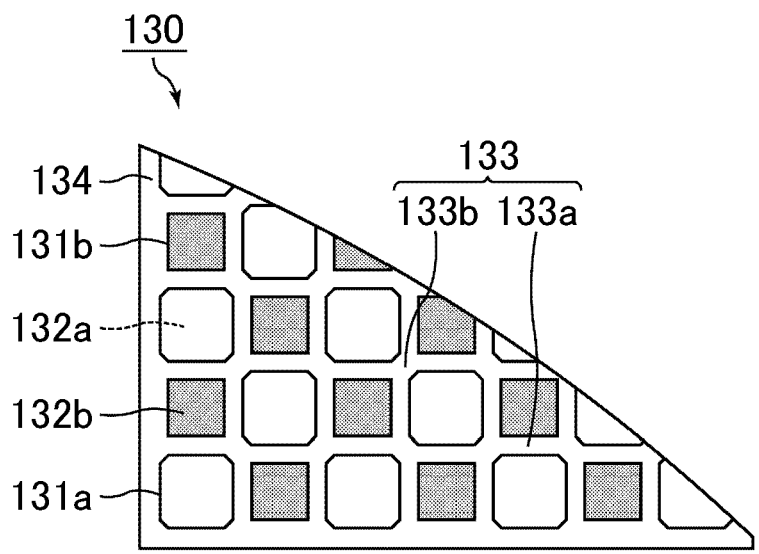

FIG. 3A and FIG. 3B are side views each schematically illustrating one example of the outer honeycomb fired body in the honeycomb structure according to the first embodiment of the present invention.

An outer honeycomb fired body 120 illustrated in FIG. 3A and an outer honeycomb fired body 130 illustrated in FIG. 3B have a cross-sectional shape excluding part of the inner honeycomb fired body 110 illustrated in FIG. 2A and FIG. 2B.

This is because upon manufacturing the honeycomb structure 10 illustrated in FIG. 1A and FIG. 1B, as described below, multiple honeycomb fired bodies 110 having shapes illustrated in FIG. 2A and FIG. 2B are combined with one another to manufacture a substantially rectangular pillar-shaped ceramic block, and thereafter the periphery of the substantially rectangular pillar-shaped ceramic block is cut to form a substantially round pillar-shaped ceramic block.

Therefore, the outer honeycomb fired body 120 illustrated in FIG. 3A and the outer honeycomb fired body 130 illustrated in FIG. 3B have the same configuration as that of the inner honeycomb fired body 110 illustrated in FIG. 2A and FIG. 2B, except that the cross-sectional shapes are different. Here, in the outer honeycomb fired body 120 illustrated in FIG. 3A and the outer honeycomb fired body 130 illustrated in FIG. 3B, the cut portions have no peripheral wall. As they are, the large volume cells 121a and 131a and the small volume cells 121b and 131b are exposed to the peripheral part as grooves. Then, as described above, the peripheral coat layer 12 is formed in the periphery of the ceramic block 13, and the exposed grooves are filled with a member in the peripheral coat layer 12.

On one end face of the honeycomb structure 10 according to the embodiments of the present invention, the large volume cells 111a, 121a, and 131a are open, and the small volume cells 111b, 121b, and 131b are plugged. In contrast, on the other end face of the honeycomb structure 10, the small volume cells 111b, 121b, and 131b are open, and the large volume cells 111a, 121a, and 131a are plugged. In the present embodiment, the end face with the large volume cells 111a, 121a, and 131a of the honeycomb structure 10 open is referred to as the first end face, and the end face with the small volume cells 111b, 121b, and 131b open is referred to as the second end face.

In order to increase the filtration area of the honeycomb structure 10 according to the embodiments of the present invention, the aperture in a cross section perpendicular to the longitudinal direction in the central part of the honeycomb structure 10 is set to about 65% or more, and the ratio of the aperture of the first end face of the honeycomb structure 10 to the aperture of the second end face of the honeycomb structure 10 (aperture of the first end face/aperture of the second end face) is set to about 1.4 or more.

In order to easily maintain mechanical properties of the honeycomb structure 10, the aperture in a cross section perpendicular to the longitudinal direction in the central part of the honeycomb structure 10 is desirably set to about 80% or less, and more desirably about 78% or less. In order to easily suppress increase in pressure loss, the aperture ratio of the honeycomb structure 10 (aperture of the first end face/aperture of the second end face) is desirably set to about 3.0 or less, and more desirably about 2.5 or less.

In the honeycomb structure 10 according to the embodiments of the present invention, the thickness of each of the cell walls 113 except the peripheral walls of the honeycomb fired bodies 110, 120, and 130 is set to about 0.1 mm or more, and less than about 0.2 mm in order to easily keep a high aperture and easily suppress increase in pressure loss. Each of the cell walls except the peripheral walls of the honeycomb fired bodies desirably has a thickness of from about 0.150 mm to about 0.195 mm.

The peripheral wall refers to a wall that is formed in the outermost periphery of each of the honeycomb fired bodies 110, 120, and 130, and is indicated by the symbols 114, 124, and 134 in FIG. 2A, FIG. 2B, FIG. 3A, and FIG. 3B. The cut portions of the honeycomb fired bodies 120 and 130 are not included in the peripheral wall.

The cell walls 113, 123, and 133 include: cell walls 113a, 123a, and 133a that partition the large volume cells 111a, 121a, and 131a and the small volume cells 111b, 121b, and 131b; and cell walls 113b, 123b, and 133b that partition the large volume cells 111a, 121a, and 131a. The cell walls 113a, 123a, and 133a and the cell walls 113b, 123b, and 133b desirably have the substantially same thickness. In addition, the cell walls 113, 123, and 133 more desirably have a thickness of from about 0.150 mm to about 0.195 mm. Note that the expression "the cell walls 113, 123, and 133" includes both the cell walls 113a, 123a, and 133a and the cell walls 113b, 123b, and 133b.

In FIG. 1A, "L" indicates the length of the honeycomb structure 10. In FIG. 1B, "D" indicates the diameter (diameter of the end face) of the honeycomb structure 10.

In the honeycomb structure 10 according to the embodiments of the present invention, the diameter (D) of the honeycomb structure 10 is set to as large as about 200 mm or more, and the ratio of the length (L) of the honeycomb structure 10 to the diameter (D) of the honeycomb structure 10 (length (L) of the honeycomb structure/diameter (D) of the honeycomb structure) is set to about 1.0 or less, whereby the pressure loss of the honeycomb structure 10 tends to become low.

In order to easily prevent reduction in mechanical strength of the end face caused by too flat a shape in the honeycomb structure 10 according to the embodiments of the present invention, the ratio of the length (L) of the honeycomb structure 10 to the diameter (D) of the honeycomb structure 10 (L/D) is set to desirably about 0.5 or more, and more desirably about 0.6 or more.

In addition, the diameter of the honeycomb structure 10 is desirably about 450 mm or less, and more desirably about 400 mm or less.

The peripheral walls 114, 124, and 134 of the honeycomb fired bodies 110, 120, and 130 in the honeycomb structure 10 according to the embodiments of the present invention desirably have a thickness of from about 0.2 mm to about 0.5 mm. If the peripheral walls 114, 124, and 134 of the honeycomb fired bodies 110, 120, and 130 have a thickness in the above range, the peripheral walls 114, 124, and 134 tend to function as a reinforcing member.

In order to allow the cell wall 113 to function as a site for maintaining mechanical properties of the honeycomb fired bodies 110, 120, and 130 in the honeycomb structure 10 according to the embodiments of the present invention, the number of cells per unit area in a cross section perpendicular to the longitudinal direction of the honeycomb fired bodies 110, 120, and 130 is desirably set to from about 31 pcs/cm$^2$ to about 62 pcs/cm$^2$ (from about 200 pcs/inch$^2$ to about 400 pcs/inch$^2$), and more desirably from about 38 pcs/cm$^2$ to about 55 pcs/cm$^2$ (from about 250 pcs/inch$^2$ to about 350 pcs/inch$^2$).

In the honeycomb structure 10 according to the embodiments of the present invention, each of the large volume cells 111a has a substantially octagonal shape in a cross section perpendicular to the longitudinal direction, and each of the small volume cells 111b has a substantially quadrangle shape in a cross section perpendicular to the longitudinal direction. In other embodiments, each of the large volume cells may have a substantially quadrangle shape in a cross section perpendicular to the longitudinal direction, and each of the small volume cells may have a substantially quadrangle shape in a cross section perpendicular to the longitudinal direction. Usually, the shape of each of the large volume cells 111a in a cross section perpendicular to the longitudinal direction and the shape of each of the small volume cells 111b in a cross section perpendicular to the longitudinal direction refer to the shape of the portions in which the large volume cells 111a and the small volume cells 111b repeat the same pattern from side to side and up and down. Each of the large volume cells and the small volume cells has a substantially arc shape on the substantially square corners in a cross section perpendicular to the longitudinal direction.

Next, a method for manufacturing the honeycomb structure according to the first embodiment of the present embodiment will be described. Here, a case will be described where silicon carbide is used as ceramic powder, the main component of the wet mixture employed as a raw material.

(1) A wet mixture containing ceramic powder and a binder is extrusion-molded to manufacture a honeycomb molded body (molding process).

Specifically, silicon carbide powders having different average particle sizes as ceramic powder, an organic binder, a liquid plasticizer, a lubricant, and water are mixed to prepare a wet mixture for manufacturing a honeycomb molded body.

Then, the wet mixture is charged into an extrusion molding machine and extrusion-molded to manufacture honeycomb molded bodies in predetermined shapes.

Here, a honeycomb molded body is manufactured with a die that can make the cross-sectional shape of the honeycomb fired body 110 having the large volume cells 111a and the small volume cells 111b illustrated in FIG. 2A and FIG. 2B.

(2) Next, the honeycomb molded bodies are cut at a predetermined length and dried with use of a drying apparatus such as a microwave drying apparatus, a hot-air drying apparatus, a dielectric drying apparatus, a reduced-pressure drying apparatus, a vacuum drying apparatus, and a freeze drying apparatus. Then, predetermined cells are plugged by filling the cells with a plug material paste to be a plug material (plugging process).

Here, the wet mixture may be used as the plug material paste.

(3) Then, the honeycomb molded body is heated in a degreasing furnace to remove organic matters in the honeycomb molded body (degreasing process). The degreased honeycomb molded body is transferred to a firing furnace and fired (firing process). In this manner, the honeycomb fired body having the configuration as illustrated in FIG. 2A and FIG. 2B is manufactured.

The plugging material paste filled into the end portion of the cells is fired by heating to be a plugging material.

Conditions for cutting, drying, plugging, degreasing, and firing may be conditions conventionally used for manufacturing honeycomb fired bodies.

(4) Next, an adhesive paste is applied to predetermined side faces of the honeycomb fired bodies, which have cells each plugged at a predetermined end portion, to form adhesive paste layers, and the honeycomb fired bodies are combined by interposing the adhesive paste. The adhesive paste layers are heated and solidified to form adhesive layers, whereby a ceramic block in which multiple honeycomb fired bodies are combined by interposing an adhesive layer is formed (combining process).

Here, the adhesive paste contains, for example, an inorganic binder, an organic binder, and inorganic particles. The adhesive paste may further contain at least one of an inorganic fiber and a whisker.

(5) A periphery cutting process is carried out to cut the ceramic block (periphery cutting process).

Specifically, the periphery of the ceramic block is cut with a diamond cutter, whereby a ceramic block whose periphery is cut into a substantially round pillar shape is manufactured.

(6) Further, a peripheral coating material paste is applied to the peripheral face of the substantially round pillar-shaped ceramic block, and is dried and solidified to form a peripheral coat layer (peripheral coat layer forming process).

The adhesive paste may be used as the peripheral coating material paste. Or alternatively, the peripheral coating material paste may be a paste having a composition different from that of the adhesive paste.

In this manner, it is possible to manufacture the honeycomb structure according to the first embodiment of the present invention.

Hereinafter, the effects of the honeycomb structure according to the first embodiment of the present invention are listed.

(1) In the case where the honeycomb structure is used for large vehicles or the like, if the volume of the honeycomb structure is large, the entire exhaust gas purifying apparatus tends to be large. In this case, it is necessary to reduce the volume of the honeycomb structure. Then, in the honeycomb structure having a diameter of about 200 mm or more, when (a) the ratio of the length of the honeycomb structure to the diameter of the honeycomb structure (length of the honeycomb structure/diameter of the honeycomb structure) is about 1.0 or less, (b) the ratio of the aperture of the first end face of the honeycomb structure to the aperture of the second end face of the honeycomb structure (aperture of the first end face/aperture of the second end face) is about 1.4 or more, (c) the cell wall except the peripheral wall of the honeycomb fired body has a thickness of about 0.1 mm or more, and less than about 0.2 mm, and (d) the aperture in a cross section perpendicular to the longitudinal direction in the central part of the honeycomb structure is about 65% or more, the volume of the obtained honeycomb structure is more likely to be reduced, the strength thereof is more likely to be increased, and the pressure loss is more likely to be decreased.

In the honeycomb structure according to the embodiment of the present invention, if at least one of (a) to (d) is not satisfied, the volume of the honeycomb structure is less likely to be reduced. In addition, high strength of the honeycomb structure is less likely to be secured, and pressure loss is less likely to be decreased.

In the case where the ratio of the length of the honeycomb structure to the diameter of the honeycomb structure (length of the honeycomb structure/diameter of the honeycomb structure) is about 1.0 or less, the increase in pressure loss caused by friction when exhaust gases pass through the cell wall is more likely to be suppressed. In addition, when the cell wall except the peripheral wall of the honeycomb fired body has a thickness of about 0.1 mm or more, and less than about 0.2 mm, contribution of the increase in pressure loss of the honeycomb structure is more likely to be reduced even if the flow speed of exhaust gases that pass through the cell wall is high.

Since the ratio of the aperture of the first end face of the honeycomb structure to the aperture of the second end face of the honeycomb structure is about 1.4 or more, and the thickness of the cell wall is about 0.1 mm or more, and less than about 0.2 mm, the aperture in a cross section perpendicular to the longitudinal direction in the central part of the honeycomb structure tends to be about 65% or more. The increase in aperture in a cross section perpendicular to the longitudinal direction in the central part of the honeycomb structure usually tends to lead to the decrease in filtration area. However, since the cell wall is thin, the filtration area is more likely to be increased, even in the case where the aperture in a cross section perpendicular to the longitudinal direction in the central part of the honeycomb structure is as high as about 65% or more. Therefore, the pressure loss of the honeycomb structure is more likely to be reduced. Thus, in the case where the honeycomb structure according to the embodiment of the present invention is used for large vehicles or the like, the volume of the honeycomb structure is more likely to be reduced, the strength thereof tends to be high, and the pressure loss thereof is more likely to be decreased.

In the honeycomb structure according to the present embodiment, since the aperture in a cross section perpendicular to the longitudinal direction in the central part of the honeycomb structure is as high as about 65% or more, the (initial) pressure loss before PM deposition is more likely to be reduced.

In the case where the honeycomb structure is used for large vehicles or the like as a honeycomb filter, since large vehicles often need continuous operation, the exhaust temperature of exhaust gases tends to be high. Therefore, PM in exhaust gases need not be forcibly combusted after deposited in a large amount in the honeycomb structure, and is more likely to be continuously combusted. Therefore, in such a honeycomb structure, it is important that the (initial) pressure loss before PM deposition can be lower than the pressure loss after PM deposition. As described above, in the honeycomb structure according to the embodiment of the present invention, the (initial) pressure loss before PM deposition is more likely to be reduced.

(2) The ratio of the aperture of the honeycomb structure according to the present embodiment (aperture of the first end face/aperture of the second end face) is about 1.4 or more, the cell wall is as thin as about 0.1 mm or more, and less than about 0.2 mm. Therefore, the filtration area is more likely to be increased, and simultaneously a high aperture of about 65% or more described above is more likely to be achieved.

(3) The honeycomb structure of the present embodiment has a diameter of about 200 mm or more, and the ratio of the length to the diameter of the honeycomb structure (length of the honeycomb structure/diameter of the honeycomb structure) is about 1.0 or less. That is, the honeycomb structure is a large honeycomb structure used for large vehicles or the like, the diameter of the honeycomb structure is large, and the length of the honeycomb structure is shorter than the diameter of a honeycomb structure. Therefore, the area of the end face of the honeycomb structure is large, and the length of the cell is short. Consequently, the increase in pressure loss of the honeycomb structure caused by friction arising when exhaust gas passes through the cells of the honeycomb structure is more likely to be suppressed. In the case where the area of the end faces of the honeycomb structure is large and the length of the cell is short, the cell wall is thin, which makes it easier to suppress the increase in pressure loss of the honeycomb structure. In addition, contribution of the increase in pressure loss of the honeycomb structure is more likely to be reduced even if the flow speed of exhaust gases that pass through the cell wall is high. Further, PM tends to be substantially uniformly deposited on the entire cell of the honeycomb structure. Thus, when the length of the honeycomb structure is shorter than the diameter of the honeycomb structure, the pressure loss of the honeycomb structure is more likely to be reduced. Therefore, the volume of the honeycomb structure is more likely to be reduced. In the case where the honeycomb structure is used for large vehicles or the like, continuous regeneration (removal of PM) of the honeycomb structure is more likely to be performed. Accordingly, it is unnecessary to deposit a large amount of PM on the honeycomb structure.

(4) The aperture in a cross section perpendicular to the longitudinal direction in the central part of the honeycomb structure according to the present embodiment is desirably about 80% or less. As the aperture in a cross section perpendicular to the longitudinal direction in the central part of the honeycomb structure is about 80% or less, the number of the cells present per unit area of the honeycomb structure is more likely to be set to a suitable number (for example, from about 31 pcs/cm$^2$ to about 62 pcs/cm$^2$). Accordingly, the cell wall functions as a wall supporting the honeycomb structure, and the mechanical strength of the honeycomb structure is more likely to be maintained within a suitable range.

(5) The ratio of the aperture of the honeycomb structure according to the present embodiment (aperture of the first end face/aperture of the second end face) is desirably about 3.0 or less. When the ratio of the aperture (aperture of the first end face/aperture of the second end face) is about 3.0 or less, it may become easier to suppress the increase in pressure loss of the honeycomb structure resulting from too high a ratio of the aperture of the first end face of the honeycomb structure to the aperture of the second end face thereof. Namely, if the difference in volumes of the large volume cells and the small volume cells in the honeycomb structure is large, the area of the cell wall that partitions the large volume cells and the small volume cells tends to be small. It presumably follows that the area of the wall out of which exhaust gases that have flowed into the honeycomb structure flow tends to decrease, and the pressure loss of the honeycomb structure tends to increase. However, in the honeycomb structure according to the embodiment of the present invention, since the aperture ratio of the honeycomb structure is about 3.0 or less, the area of the cell wall that partitions the large volume cells and the small volume cells tends not to be small. Therefore, the area of the wall out of which exhaust gases that have flowed into the honeycomb structure flow tends not to decrease, and the pressure loss of the honeycomb structure tends not to increase.

(6) The ratio of the length to the diameter of the honeycomb structure according to the present embodiment (length of the honeycomb structure/diameter of the honeycomb structure) is desirably about 0.5 or more.

If the ratio of the length to the diameter of the honeycomb structure is too low, less than about 0.5, exhaust gases that have flowed into the honeycomb structure tend to flow backward (exhaust gas outlet side). Therefore, PM is more likely to be accumulated only on the exhaust gas outlet side of the honeycomb structure. As a result, the pressure loss of the honeycomb structure tends to increase. When the ratio of the length to the diameter of the honeycomb structure is about 0.5 or more, exhaust gases that have flowed into the honeycomb structure tend not to flow backward. Therefore, PM tends to be substantially uniformly deposited on the cell wall of the honeycomb structure. As a result, the pressure loss of the honeycomb structure tends not to increase.

(7) In the honeycomb structure according to the present embodiment, the peripheral wall of the honeycomb fired body desirably has a thickness of from about 0.2 mm to about 0.5 mm. If the peripheral wall of the honeycomb fired body has a thickness of from about 0.2 mm to about 0.5 mm, the peripheral wall is thicker than the cell wall of the honeycomb structure. Therefore, even if the cell wall of the honeycomb fired body is thin, the peripheral wall of the honeycomb fired body tends to function as a reinforcing material for maintaining mechanical strength, and mechanical properties of the honeycomb fired body are more likely to be favorably maintained.

(8) In the honeycomb structure according to the present embodiment, the number of cells per unit area in a cross section perpendicular to the longitudinal direction of the honeycomb fired body is desirably from about 31 pcs/cm$^2$ to about 62 pcs/cm$^2$. When the number of cells per unit area in a cross section perpendicular to the longitudinal direction of the honeycomb fired body is from about 31 pcs/cm$^2$ to about 62 pcs/cm$^2$, the number (area) of the cell walls per unit area in the cross section of the honeycomb structure tends to be within a suitable range, the cell wall tends to function as a site for maintaining mechanical properties of the honeycomb fired body, and the honeycomb structure tends to maintain mechanical properties.

(9) In the honeycomb structure according to the present embodiment, each of the large volume cells desirably has a substantially octagonal shape in a cross section perpendicular to the longitudinal direction, and each of the small volume cells desirably has a substantially quadrangle shape in a cross section perpendicular to the longitudinal direction. If the cells of the honeycomb structure have substantially octagonal and substantially quadrangular cross-sectional shapes, these shapes are more likely to be combined, and a honeycomb structure is more likely to be manufactured in which large volume cells and small volume cells are combined in good balance. Therefore, mechanical strength of the honeycomb structure is more likely to be improved.

EXAMPLES

Hereinafter, examples are given for more specifically describing the first embodiment of the present invention. However, the present invention is not limited only to these examples.

Example 1

(1) Manufacture of Honeycomb Fired Body

First, 54.6% by weight of a silicon carbide coarse powder having an average particle size of 22 μm and 23.4% by weight of a silicon carbide fine powder having an average particle size of 0.5 μm were mixed. To the resulting mixture, 4.3% by weight of an organic binder (methylcellulose), 2.6% by weight of a lubricant (UNILUB, manufactured by NOF Corporation), 1.2% by weight of glycerin, and 13.9% by weight of water were added, and then kneaded to prepare a wet mixture. Thereafter, the obtained wet mixture was used for extrusion molding, and a honeycomb molded body was obtained.

In this process, there was manufactured a raw honeycomb molded body having approximately the same shape as that of the inner honeycomb fired body 110 illustrated in FIG. 2A and FIG. 2B with cells not plugged.

Next, the raw honeycomb molded bodies were dried with a microwave drying apparatus to obtain dried honeycomb molded bodies. Predetermined cells of the dried honeycomb molded bodies were plugged by filling the cells with a plug material paste. The wet mixture was used as the plug material paste. Thereafter, the dried honeycomb molded bodies, which have predetermined cells filled with the plug material paste, were dried with a drying apparatus again.

Subsequently, cells were plugged, and thereafter the dried honeycomb molded bodies were degreased at 400° C., and then fired at 2200° C. under normal pressure argon atmosphere for three hours.

In this manner, a honeycomb fired body 110 (also referred to as a honeycomb unit) was manufactured.

The obtained honeycomb fired body includes a porous silicon carbide sintered body, has large volume cells with an octagonal cross-sectional shape and small volume cells with a quadrangular cross-sectional shape, as illustrated in FIG. 2A and FIG. 2B, and has a porosity of 42%, an average pore size of 9 μm, a size of 34.3 mm×34.3 mm×200 mm, the number of cells (cell density) of 46.5 pcs/cm$^2$ (300 pcs/inch$^2$), a thickness of the cell wall of 0.175 mm, and a thickness of the peripheral wall of 0.3 mm.

(2) Manufacture of Honeycomb Structure

A honeycomb structure was manufactured with each of the honeycomb fired bodies obtained in the above processes.

An adhesive paste was applied to predetermined side faces of the honeycomb fired bodies 1, and 36 pieces (6 pieces in length×6 pieces in breadth) of the honeycomb fired bodies 1 were combined with one another by interposing the adhesive paste. In this manner, an aggregate of the honeycomb fired bodies was manufactured.

The aggregate of the honeycomb fired bodies was heated at 180° C. for 20 minutes to dry and solidify the adhesive paste. In this manner, a rectangular pillar-shaped ceramic block having the adhesive layer of 1.0 mm in thickness was manufactured.

Here, as the adhesive paste, an adhesive paste having the following composition was used. The adhesive paste contains 30.0% by weight of silicon carbide having an average particle size of 0.6 μm, 21.4% by weight of silica sol (solids content: 30% by weight), 8.0% by weight of carboxymethyl cellulose, and 40.6% by weight of water.

Subsequently, the periphery of the rectangular pillar-shaped ceramic block was cut with a diamond cutter. In this manner, a round pillar-shaped ceramic block having a diameter of 198 mm was manufactured.

Next, a peripheral coating material paste was applied to the peripheral part of the round pillar-shaped ceramic block, and the peripheral coating material paste was heated and solidified at 120° C. In this manner, a peripheral coat layer having a thickness of 1.0 mm was formed around the peripheral part of the ceramic block. Here, the adhesive paste was used as the peripheral coating material paste.

Through the above processes, a round pillar-shaped honeycomb structure having a diameter of 200 mm×a length of 200 mm and having a volume of 6.28 L was manufactured.

The aperture in a cross section perpendicular to the longitudinal direction in the central part of the obtained honeycomb structure is 71.1%, and the ratio of the aperture of the first end face (end face with small volume cells open) of the honeycomb structure to the aperture of the second end face (end face with large volume cells open) of the honeycomb structure (aperture of the first end face/aperture of the second end face) is 1.46. The ratio of the length of the honeycomb structure to the diameter of the honeycomb structure (length of the honeycomb structure/diameter of the honeycomb structure) is 1.00.

The aperture was calculated by photographing the cross section perpendicular to the longitudinal direction in the central part of the honeycomb structure, the first end face of the honeycomb structure, and the second end face of the honeycomb structure, and determining, from the obtained photographs, the total area of each of these and the area of the opening-forming portion thereof.

Hereinafter, the aperture in a cross section perpendicular to the longitudinal direction in the central part of the honeycomb structure is referred to as an aperture in the central part. The ratio of the aperture (aperture of the first end face/aperture of the second end face) is also simply referred to as an aperture ratio. The ratio of the length of the honeycomb structure to the diameter of the honeycomb structure (length of the honeycomb structure/diameter of the honeycomb structure) is also referred to as a ratio of the length to the diameter (length/diameter).

Table 1 shows the diameter of the honeycomb structure, the length of the honeycomb structure, the ratio of the length to the diameter (length/diameter), the volume of the honeycomb structure, the thickness of the cell wall of the honeycomb fired body in the honeycomb structure, the cell density (pcs/cm$^2$), the aperture in the central part, and the aperture ratio.

Example 2 to 7 and Comparative Example 1 to 6

A honeycomb fired body was manufactured as in Example 1, except that a die was varied if necessary in order to change the thickness of the cell wall and the cell density (pcs/cm$^2$) of the honeycomb fired body to be manufactured to values shown in Examples 2 to 7 and Comparative Examples 1 to 6 in Table 1, and that cutting conditions were varied if necessary in order to change the length of the honeycomb fired body to values shown in Examples 2 to 7 and Comparative Examples 1 to 6 in Table 1.

Next, a honeycomb fired body was manufactured as in Example 1, except that the number of the honeycomb fired bodies to be combined and the thickness of the adhesive layer or the peripheral coat layer were varied in order to change the aperture in the central part and the aperture ratio of the honeycomb structure to be manufactured, and the diameter, the length, the ratio of the length to the diameter (length/diameter), the aperture in the central part, and the aperture ratio of the honeycomb structure to values shown in Examples 2 to 7 and Comparative Examples 1 to 6 in Table 1.

The honeycomb structure obtained in Example 2 had a thickness of a cell wall of 0.175 mm, a cell density of 46.5 pcs/cm² (300 pcs/inch²), an aperture in the central part of 71.1%, an aperture ratio of 1.46, a diameter of 225 mm, a length of 158 mm, a ratio of a length to a diameter (length/diameter) of 0.70, and a volume of 6.28 L.

The honeycomb structure obtained in Example 3 had a thickness of a cell wall of 0.175 mm, a cell density of 46.5 pcs/cm² (300 pcs/inch²), an aperture in the central part of 71.1%, an aperture ratio of 1.46, a diameter of 250 mm, a length of 128 mm, a ratio of a length to a diameter (length/diameter) of 0.51, and a volume of 6.28 L.

The honeycomb structure obtained in Example 4 had a thickness of a cell wall of 0.150 mm, a cell density of 46.5 pcs/cm² (300 pcs/inch²), an aperture in the central part of 73.7%, an aperture ratio of 1.46, a diameter of 225 mm, a length of 158 mm, a ratio of a length to a diameter (length/diameter) of 0.70, and a volume of 6.28 L.

The honeycomb structure obtained in Example 5 had a thickness of a cell wall of 0.100 mm, a cell density of 62 pcs/cm² (400 pcs/inch²), an aperture in the central part of 79.1%, an aperture ratio of 1.46, a diameter of 225 mm, a length of 158 mm, a ratio of a length to a diameter (length/diameter) of 0.70, and a volume of 6.28 L.

The honeycomb structure obtained in Example 6 had a thickness of a cell wall of 0.195 mm, a cell density of 46.5 pcs/cm² (300 pcs/inch²), an aperture in the central part of 68.5%, an aperture ratio of 1.46, a diameter of 225 mm, a length of 158 mm, a ratio of a length to a diameter (length/diameter) of 0.70, and a volume of 6.28 L.

The honeycomb structure obtained in Example 7 had a thickness of a cell wall of 0.175 mm, a cell density of 46.5 pcs/cm² (300 pcs/inch²), an aperture in the central part of 71.1%, an aperture ratio of 2.29, a diameter of 225 mm, a length of 158 mm, a ratio of a length to a diameter (length/diameter) of 0.70, and a volume of 6.28 L.

The honeycomb structure obtained in Comparative Example 1 had a thickness of a cell wall of 0.175 mm, a cell density of 46.5 pcs/cm² (300 pcs/inch²), an aperture in the central part of 71.1%, an aperture ratio of 1.46, a diameter of 180 mm, a length of 247 mm, a ratio of a length to a diameter (length/diameter) of 1.37, and a volume of 6.29 L. The diameter of the honeycomb structure and the ratio of the length to the diameter thereof (length/diameter) do not satisfy the requirements described in the embodiment of the present invention.

The honeycomb structure obtained in Comparative Example 2 had a thickness of a cell wall of 0.300 mm, a cell density of 46.5 pcs/cm² (300 pcs/inch²), an aperture in the central part of 58.6%, an aperture ratio of 1.46, a diameter of 225 mm, a length of 158 mm, a ratio of a length to a diameter (length/diameter) of 0.70, and a volume of 6.28 L. The thickness of the cell wall in the honeycomb structure and the aperture in the central part do not satisfy the requirements described in the embodiment of the present invention.

The honeycomb structure obtained in Comparative Example 3 had a thickness of a cell wall of 0.150 mm, a cell density of 46.5 pcs/cm² (300 pcs/inch²), an aperture in the central part of 73.7%, an aperture ratio of 1.46, a diameter of 180 mm, a length of 247 mm, a ratio of a length to a diameter (length/diameter) of 1.37, and a volume of 6.29 L. The diameter of the honeycomb structure and the ratio of the length to the diameter thereof (length/diameter) do not satisfy the requirements described in the embodiment of the present invention.

The honeycomb structure obtained in Comparative Example 4 had a thickness of a cell wall of 0.100 mm, a cell density of 62 pcs/cm² (400 pcs/inch²), an aperture in the central part of 79.1%, an aperture ratio of 1.46, a diameter of 180 mm, a length of 247 mm, a ratio of a length to a diameter (length/diameter) of 1.37, and a volume of 6.29 L. The diameter of the honeycomb structure and the ratio of the length to the diameter thereof (length/diameter) do not satisfy the requirements described in the embodiment of the present invention.

The honeycomb structure obtained in Comparative Example 5 had a thickness of a cell wall of 0.200 mm, a cell density of 46.5 pcs/cm² (300 pcs/inch²), an aperture in the central part of 68.5%, an aperture ratio of 1.46, a diameter of 180 mm, a length of 247 mm, a ratio of a length to a diameter (length/diameter) of 1.37, and a volume of 6.29 L. The thickness of the cell wall in the honeycomb structure, the diameter of the honeycomb structure, and the ratio of the length to the diameter thereof (length/diameter) do not satisfy the requirements described in the embodiment of the present invention.

The honeycomb structure obtained in Comparative Example 6 had a thickness of a cell wall of 0.175 mm, a cell density of 46.5 pcs/cm² (300 pcs/inch²), an aperture in the central part of 71.1%, an aperture ratio of 1.46, a diameter of 200 mm, a length of 225 mm, a ratio of a length to a diameter (length/diameter) of 1.13, and a volume of 7.07 L. The ratio of the length to the diameter thereof (length/diameter) does not satisfy the requirements described in the embodiment of the present invention.

Pressure losses in Examples 1 to 7 and Comparative Examples 1 to 6 were measured as follows.

[Pressure Loss Measurement]

Figure 4:
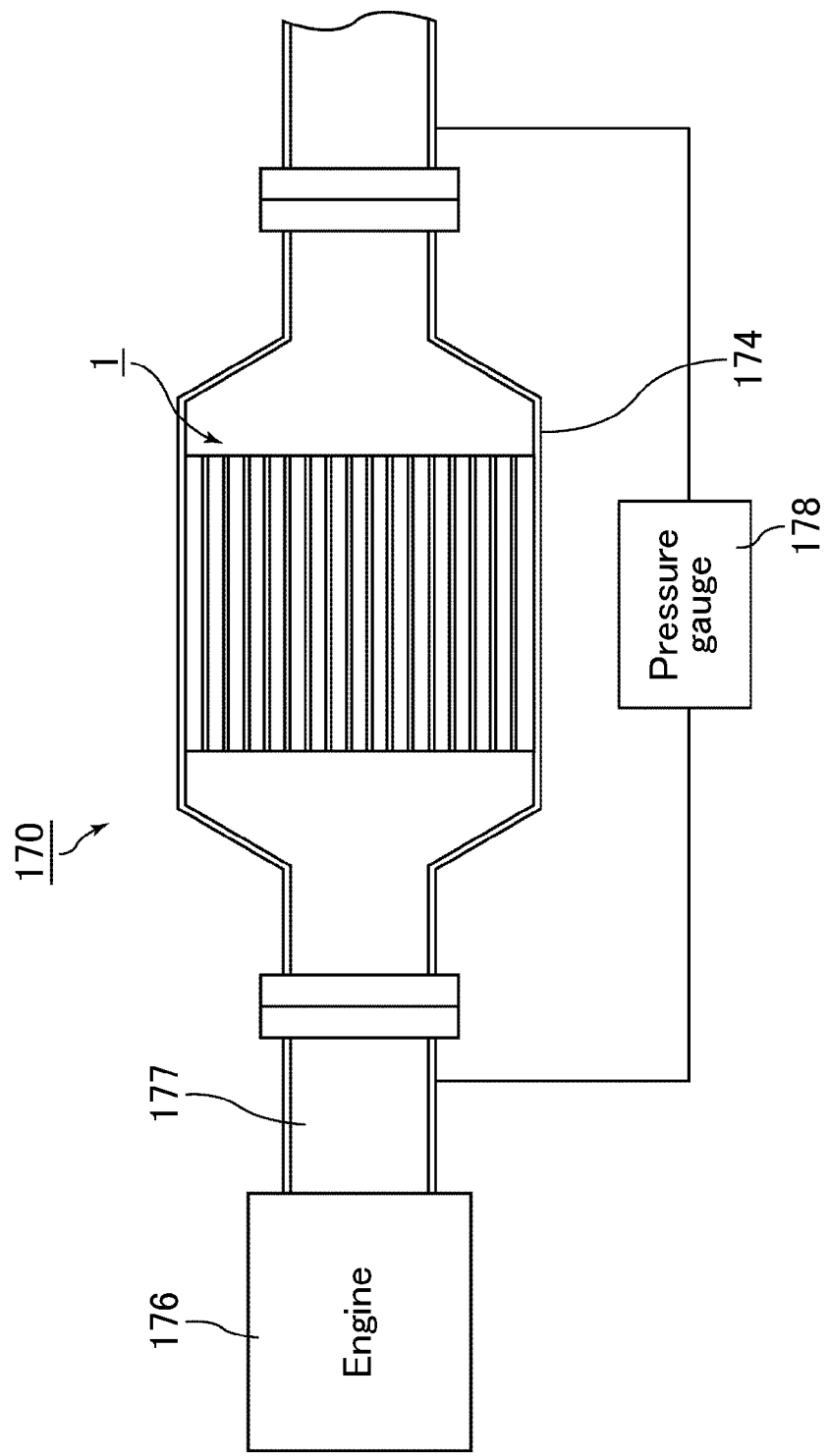
FIG. 4 is an explanatory view illustrating a pressure loss measuring apparatus in Example 1 and Comparative Example 1.

FIG. 4 is an explanatory view illustrating a pressure loss measuring apparatus 170 in Example 1 and Comparative Example 1.

As illustrated in FIG. 4, a metal casing 174 is attached to an exhaust pipe 177 of a 6.4 L common rail-type diesel engine 176 in the pressure loss measuring apparatus 170, and a honeycomb structure 1 around which an alumina mat (holding sealing material) is wound is disposed inside the metal casing 174. A pressure gauge 178 is attached in front and back of the honeycomb structure 1.

Using the pressure loss measuring apparatus 170 illustrated in FIG. 4, the number of revolutions and the torque were set to 3000 rpm and 50 Nm, respectively, 25 g PM was deposited on the honeycomb structure, and the pressure difference at this time was measured and regarded as a pressure loss.

TABLE 1

|  | Thickness of cell wall (mm) | Cell density (pcs/cm²) | Aperture in cetral part (%) | Aperture ratio | Diameter (mm) | Length (mm) | Ratio (length/diameter) | Volume (L) | Pressure loss (kPa) |
|---|---|---|---|---|---|---|---|---|---|
| Example 1 | 0.175 | 46.5 | 71.1 | 1.46 | 200 | 200 | 1.00 | 6.28 | 2.8 |
| Example 2 | 0.175 | 46.5 | 71.1 | 1.46 | 225 | 158 | 0.70 | 6.28 | 2.6 |
| Example 3 | 0.175 | 46.5 | 71.1 | 1.46 | 250 | 128 | 0.51 | 6.28 | 2.8 |

TABLE 1-continued

|  | Thickness of cell wall (mm) | Cell density (pcs/cm$^2$) | Aperture in cetral part (%) | Aperture ratio | Diameter (mm) | Length (mm) | Ratio (length/ diameter) | Volume (L) | Pressure loss (kPa) |
|---|---|---|---|---|---|---|---|---|---|
| Example 4 | 0.150 | 46.5 | 73.7 | 1.46 | 225 | 158 | 0.70 | 6.28 | 2.4 |
| Example 5 | 0.100 | 62 | 79.1 | 1.46 | 225 | 158 | 0.70 | 6.28 | 2.3 |
| Example 6 | 0.195 | 46.5 | 68.5 | 1.46 | 225 | 158 | 0.70 | 6.28 | 2.8 |
| Example 7 | 0.175 | 46.5 | 71.1 | 2.29 | 225 | 158 | 0.70 | 6.28 | 2.7 |
| Comparative Example 1 | 0.175 | 46.5 | 71.1 | 1.46 | 180 | 247 | 1.37 | 6.29 | 3.4 |
| Comparative Example 2 | 0.300 | 46.5 | 58.6 | 1.46 | 225 | 158 | 0.70 | 6.28 | 4.2 |
| Comparative Example 3 | 0.150 | 46.5 | 73.7 | 1.46 | 180 | 247 | 1.37 | 6.29 | 3.1 |
| Comparative Example 4 | 0.100 | 62 | 79.1 | 1.46 | 180 | 247 | 1.37 | 6.29 | 3.0 |
| Comparative Example 5 | 0.200 | 46.5 | 68.5 | 1.46 | 180 | 247 | 1.37 | 6.29 | 3.2 |
| Comparative Example 6 | 0.175 | 46.5 | 71.1 | 1.46 | 200 | 225 | 1.13 | 7.07 | 2.8 |

In each of the honeycomb structures according to Examples 1 to 7, the thickness of the cell wall, the central part aperture, and the aperture ratio of the honeycomb fired body in the honeycomb structure, and the diameter, the length, the ratio of the length to the diameter (length/diameter) of the honeycomb structure satisfy the conditions described in the embodiment of the present invention. The pressure loss of Example 1 was 2.8 kPa, the pressure loss of Example 2 was 2.6 kPa, the pressure loss of Example 3 was 2.8 kPa, the pressure loss of Example 4 was 2.4 kPa, the pressure loss of Example 5 was 2.3 kPa, the pressure loss of Example 6 was 2.8 kPa, and the pressure loss of Example 7 was 2.7 kPa. The pressure losses of the honeycomb structures of Examples 1 to 7 were in the range of from 2.3 kPa to 2.8 kPa, and favorable.

In contrast, the honeycomb structures according to Comparative Examples 1 to 6 do not satisfy the conditions described in the embodiment of the present invention. The pressure loss of Comparative Example 1 was 3.4 kPa, the pressure loss of the Comparative Example 2 was 4.2 kPa, the pressure loss of the Comparative Example 3 was 3.1 kPa, the pressure loss of the Comparative Example 4 was 3.0 kPa, the pressure loss of the Comparative Example 5 was 3.2 kPa, and the pressure loss of the Comparative Example 6 was 2.8 kPa. The pressure losses of the honeycomb structures of Comparative Examples 1 to 6 were in the range of from 2.8 kPa to 4.2 kPa, and higher than the pressure losses of the honeycomb structures of Examples 1 to 7.

The honeycomb structures in Comparative Examples 1 to 5 had substantially the same volumes as those of the honeycomb structures in Examples 1 to 7, and had high pressure losses of the honeycomb structures in the range of from 3.0 kPa to 4.2 kPa. In Comparative Example 6, the pressure loss of the honeycomb structure was 2.8 kPa, similar to those in Examples 1 to 7, but the volume was larger than those in Examples 1 to 7.

Second Embodiment

Next, the second embodiment that is one embodiment of the present invention will be described with reference to drawings.

Figure 5:
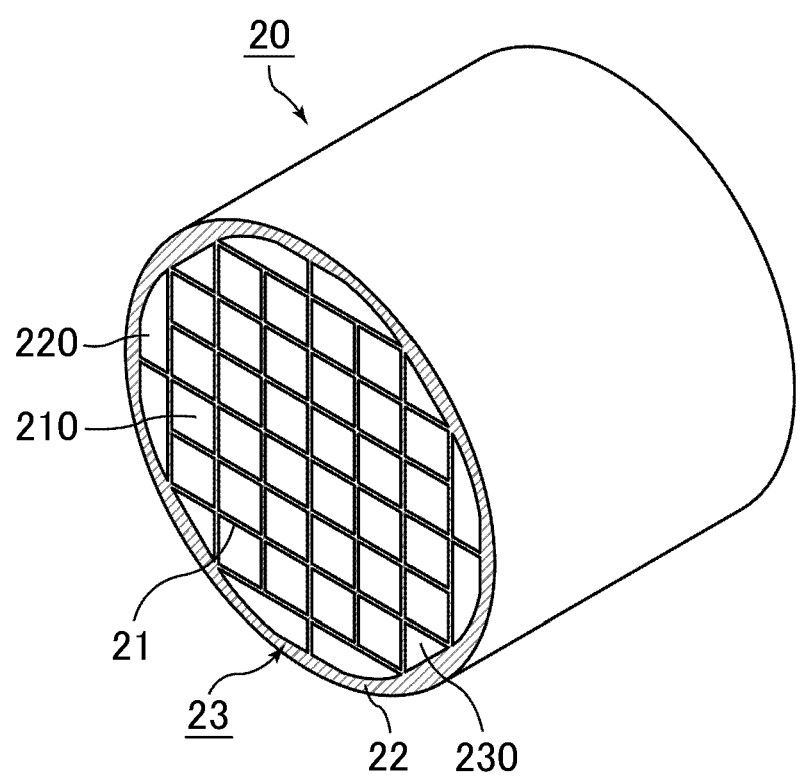
FIG. 5 is a perspective view schematically illustrating one example of a honeycomb structure according to a second embodiment of the present invention.

FIG. 5 is a perspective view schematically illustrating one example of a honeycomb structure of a second embodiment of the present invention.

Figure 6A:
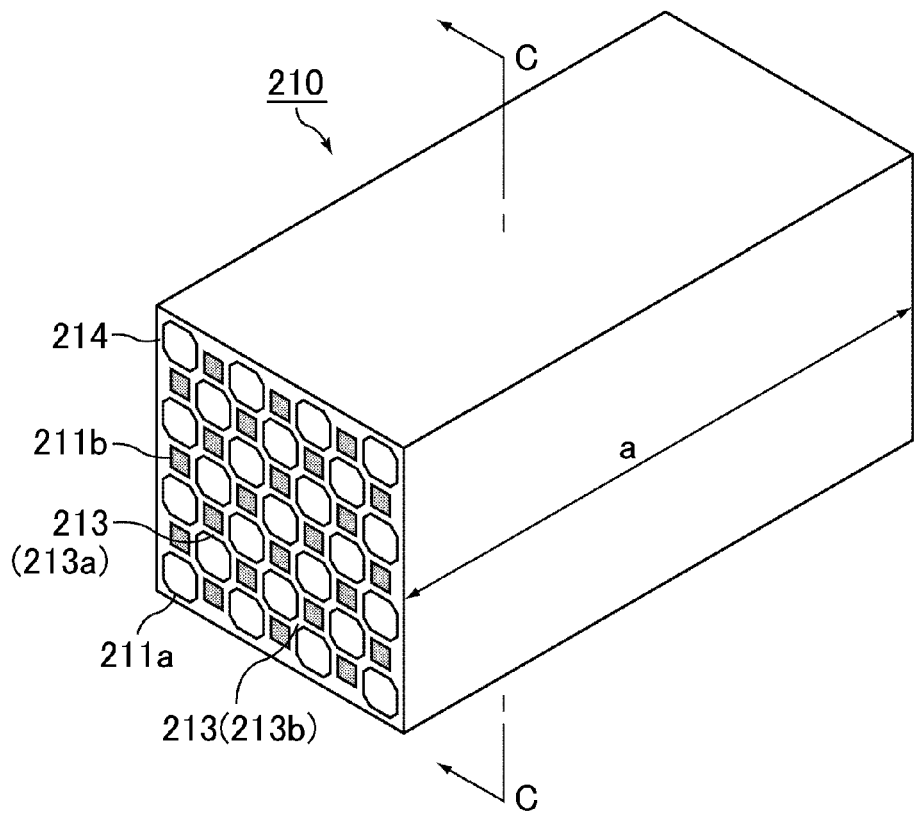
FIG. 6A is a perspective view schematically illustrating one example of a honeycomb fired body in the honeycomb structure according to the second embodiment of the present invention.
Figure 6B:
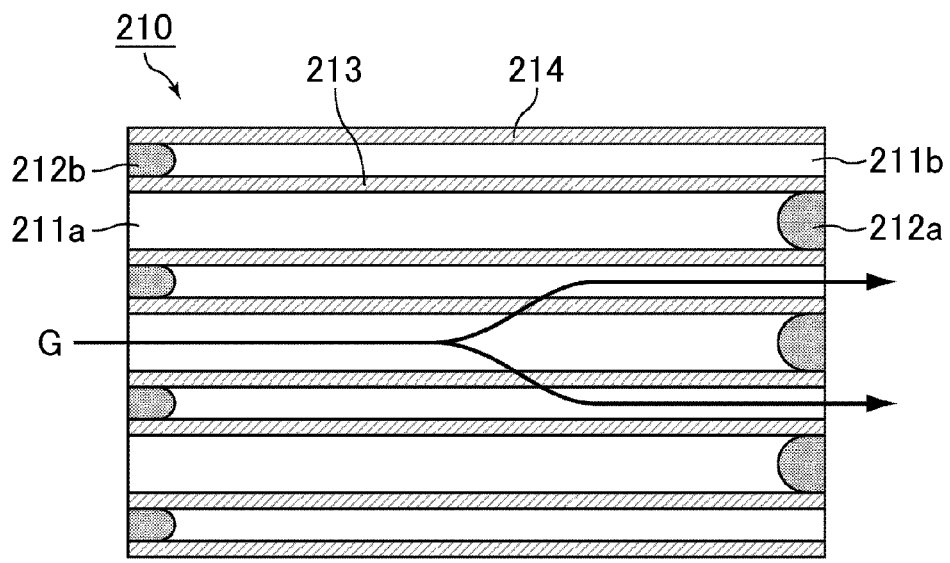
FIG. 6B is a C-C line cross-sectional view of the honeycomb fired body illustrated in FIG. 6A.

FIG. 6A is a perspective view schematically illustrating one example of a honeycomb fired body in the honeycomb structure according to the second embodiment of the present invention. FIG. 6B is a C-C line cross-sectional view of the honeycomb fired body illustrated in FIG. 6A.

Figure 7:
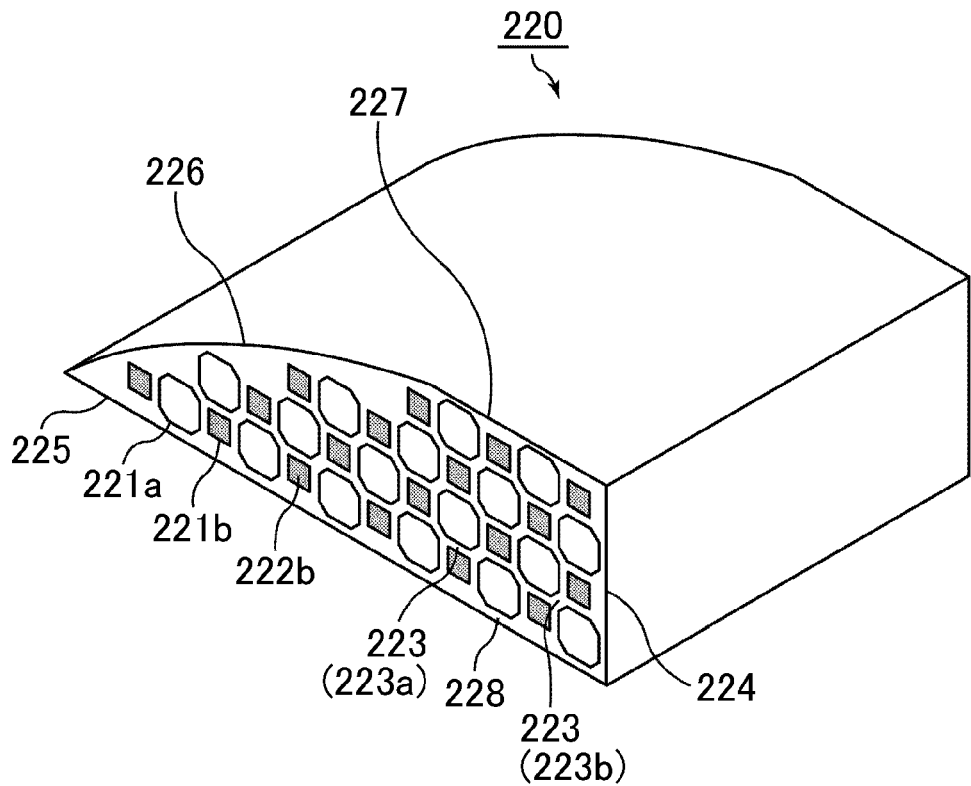
FIG. 7 is a perspective view schematically illustrating another example of a honeycomb fired body in the honeycomb structure according to the second embodiment of the present invention.

FIG. 7 is a perspective view schematically illustrating another example of a honeycomb fired body in the honeycomb structure according to the second embodiment of the present invention.

Figure 8:
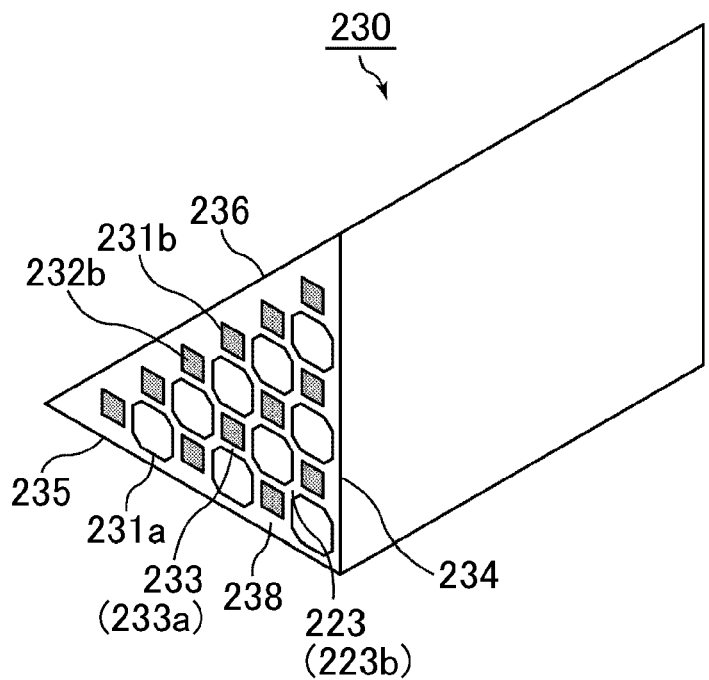
FIG. 8 is a perspective view schematically illustrating one example of a honeycomb fired body having another configuration in the honeycomb structure according to the second embodiment of the present invention.

FIG. 8 is a perspective view schematically illustrating another example of a honeycomb fired body having another configuration in a honeycomb structure according to the second embodiment of the present invention.

Figure 9:
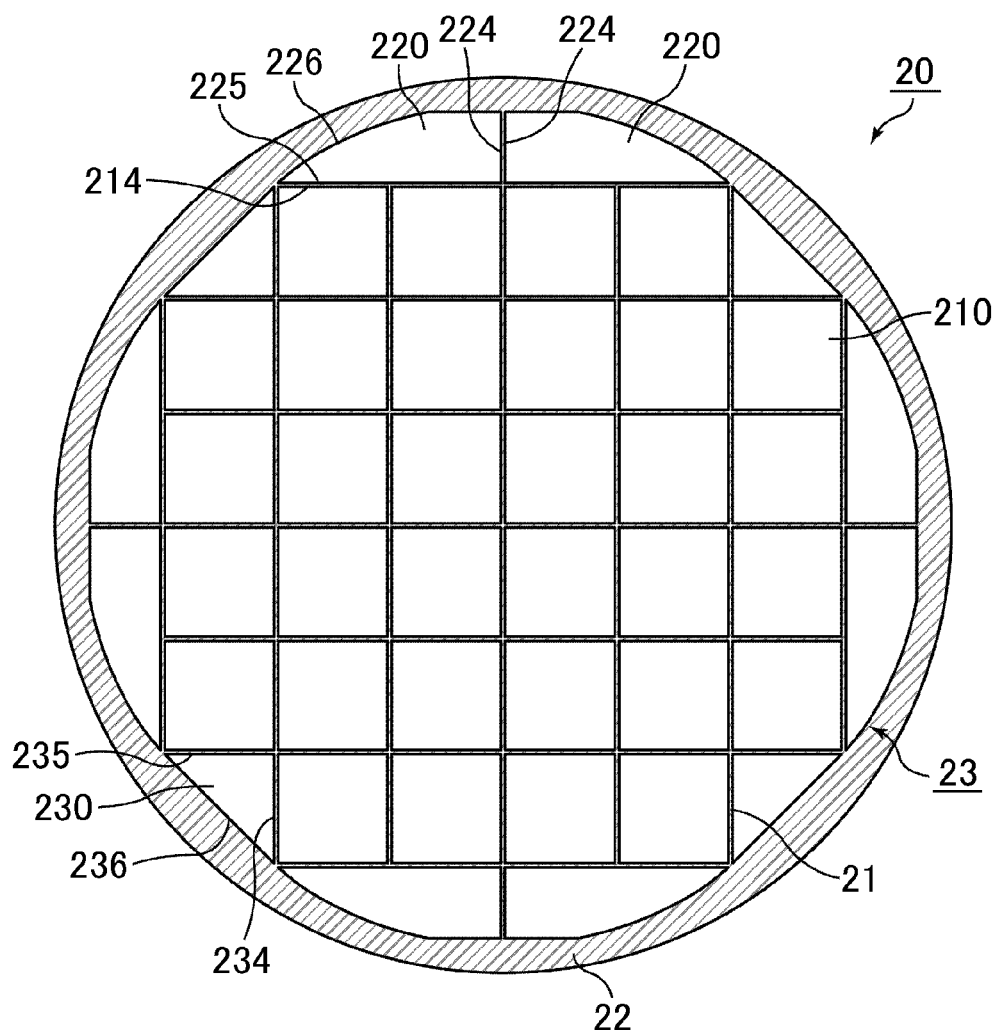
FIG. 9 is a side view of the honeycomb structure according to the second embodiment of the present invention illustrated in FIG. 5.

FIG. 9 is a side view of the honeycomb structure according to the second embodiment of the present invention illustrated in FIG. 5.

In an honeycomb structure 20 illustrated in FIG. 5, multiple honeycomb fired bodies 210, 220, and 230 having shapes illustrated in FIG. 6A, FIG. 6B, FIG. 7, and FIG. 8 and made of porous silicon carbide are combined with one another by interposing an adhesive layer 21 to form a ceramic block 23, and a peripheral coat layer 22 is formed around this ceramic block 23.

In the honeycomb structure 20 illustrated in FIG. 5, 8 pieces of the honeycomb fired bodies 220 located in the periphery of the ceramic block 23, 4 pieces of the honeycomb fired bodies 230 having shapes different from those of the honeycomb fired bodies 220, and 32 pieces of the honeycomb fired bodies 210 located inward of the honeycomb fired bodies 220 and 230 are combined with one another by interposing an adhesive layer 21. In addition, a peripheral coat layer 22 is formed in a peripheral part, and thereby the entire honeycomb structure has a substantially circle shape in a cross section perpendicular to the entire honeycomb structure.

In the honeycomb fired body 210 shown in FIG. 6A and FIG. 6B, as in the honeycomb fired body 110 according to the first embodiment of the present invention, a large number of large volume cells 211a and small volume cells 211b are disposed in parallel with one another in a longitudinal direction (direction of arrow "a" in FIG. 6A) with a cell wall 213 interposed therebetween. Either one end portion of each of the large volume cells 211a and the small volume cells 211b is plugged with a plug material 212a and a plug material 212b.

In the present embodiment, the end portion of each of the small volume cells 211b is plugged with the plug material 212b on an exhaust gas inlet side, and the end portion of each of the large volume cells 211a is plugged with the plug material 212a on the exhaust gas outlet side.

Therefore, exhaust gases G which have flowed into one of the large volume cells 211a with an opening on one end face on the exhaust gas inlet side surely pass through the cell wall 213 that partitions the large volume cells 211a and the small volume cells 211b, and flow out from the small volume cells 211b with an opening on the other end face on the exhaust gas outlet side. When the exhaust gases G pass through the cell wall 213, the cell wall 213 captures PM and the like in the exhaust gases. Thus, the cell wall 213 functions as a filter.

Each of the 32 pieces of honeycomb fired bodies 210 are honeycomb fired bodies having a substantially quadrangle shape in a cross section perpendicular to the longitudinal direction.

Four sides 214 located in the periphery of the substantially quadrangle have substantially the same length, and each of the honeycomb fired bodies 210 has a substantially square shape in a cross section perpendicular to the longitudinal direction.

A honeycomb fired body 220 illustrated in FIG. 7 and located in the vicinity of the periphery of the honeycomb structure 20, as well as the honeycomb fired body 210, has a large number of large volume cells 221a and small volume cells 221b, plug materials 222a (not illustrated), plug materials 222b, and cell walls 223 (cell walls 223a and cell walls 223b). Thus, the honeycomb fired body 220 functions as a filter for capturing PM and the like.

In addition, a peripheral wall 228 is formed in the peripheral part of the honeycomb fired body 220.

Each of the honeycomb fired bodies 220 has a shape including a first side 224, a second side 225, a third side 227, and an inclined side 226.

The angle formed by the first side 224 and the second side 225 is a substantially right angle, and the inclined side 226 is located opposite to the substantially right angle. The inclined side 226 has a substantially arc shape.

The expression "opposite to the substantially right angle" used herein refers to "facing the substantially right angle", and means a side different from two sides forming the substantially right angle.

The third side 227 is a side connected to the inclined side 226 and the first side 224, and is substantially parallel to the second side 225.

That is, the honeycomb fired body 220 is a honeycomb fired body having a substantially sector cross section formed by one substantially arc and three straight lines.

A honeycomb fired body 230 illustrated in FIG. 8, as well as the honeycomb fired body 210, has a large number of large volume cells 231a and small volume cells 231b, plug materials 232a (not illustrated), plug materials 232b, and cell walls 233 (cell walls 233a and cell walls 233b). Thus, the honeycomb fired body 230 functions as a filter for capturing PM and the like.

Each of the honeycomb fired bodies 230 are honeycomb fired bodies having a substantially triangle shape in a cross section perpendicular to the longitudinal direction.

In a cross section perpendicular to the longitudinal direction, each of the honeycomb fired bodies 230 has a substantially right angle shape formed by a first side 234 and a second side 235 and has a substantially right-angled isosceles triangle shape having a slope 236 opposite to the aforementioned substantially right angle. In addition, a peripheral wall 238 is formed in the peripheral part of the honeycomb fired body 230.

In the present description, the shape of each honeycomb fired body and the shape of each cell are referred to as a substantially triangle, a substantially quadrangle, and the like. The substantially triangle and substantially quadrangle used herein do not mean precise drawings formed only by perfect straight lines, but include shapes whose corners (tops) are chamfered and which can be substantially identifiable as a triangle and a quadrangle. In addition, the terms such as "substantially right angle", "substantially parallel", and "substantially right-angled isosceles triangle" used herein do not mean precise drawings, but include shapes which can be substantially identifiable as shapes such as "right angle", "parallel", and "right-angled isosceles triangle".

FIG. 9 is a side view of the honeycomb structure 20 illustrated in FIG. 5.

Hereinafter, the arrangement of the honeycomb fired bodies 210, the honeycomb fired bodies 220, and the honeycomb fired bodies 230 in the honeycomb structure 20 will be described with reference to FIG. 9.

The honeycomb fired bodies 210 (honeycomb fired bodies having a quadrangle cross section) are disposed in a cross section in the central part of the honeycomb structure 20. The number of the honeycomb fired bodies 210 is 32 pieces.

Eight pieces of the honeycomb fired bodies 220 (honeycomb fired bodies having a sector cross section) are disposed around the honeycomb fired bodies 210. The honeycomb fired bodies 220 are disposed so that the second sides 225 thereof are adjacent to the honeycomb fired bodies 210 and the inclined sides 226 thereof correspond to the outermost periphery of the ceramic block 23. The honeycomb fired bodies 220 are disposed so that the first sides 224 of the honeycomb fired bodies 220 are adjacent to each other.

The second sides 225 of the honeycomb fired bodies 220 are longer than the sides 214 in the periphery of the honeycomb fired bodies 210.

In particular, the second sides 225 of the honeycomb fired bodies 220 are desirably from about 1.5 times to about 2.5 times as long as the sides 214 in the periphery of the honeycomb fired bodies 210.

Four pieces of honeycomb fired bodies 230 (honeycomb fired bodies having a substantially triangle cross section) are disposed in portions not including the honeycomb fired bodies 220 in the periphery of the honeycomb fired bodies 210.

The honeycomb fired bodies 230 are disposed so that the first sides 234 thereof and the second sides 225 thereof are adjacent to the honeycomb fired bodies 210 and the inclined sides 236 thereof correspond to the outermost periphery of the ceramic block 23.

In this honeycomb structure 20, the number of honeycomb fired bodies is 44 pieces in total. The honeycomb structure 20 includes 32 pieces of the honeycomb fired bodies 210, 8 pieces of the honeycomb fired bodies 220, and 4 pieces of the honeycomb fired bodies 230.

In addition, 44 pieces of the honeycomb fired bodies 210, 220, and 230 are combined with one another by interposing an adhesive layer 21 to form the ceramic block 23.

Further, a sealing material layer 22 is formed in the peripheral face of the ceramic block 23, and the honeycomb structure 20 has a substantially round shape in a cross section perpendicular to the longitudinal direction.

Also in the honeycomb structure 20 according to the embodiment of the present invention, the aperture in a cross section perpendicular to the longitudinal direction in the central part of the honeycomb structure 20 is about 65% or more, and the ratio of the aperture of the first end face (end face with large volume cells open) of the honeycomb structure 20 to the aperture of the second end face (end face with small volume cells open) of the honeycomb structure 20 (aperture of the first end face/aperture of the second end face) is about 1.4 or more.

The aperture in a cross section perpendicular to the longitudinal direction in the central part of the honeycomb structure 20 is desirably about 80% or less, and more desirably about 78% or less. The ratio of the aperture of the honeycomb structure 20 (aperture of the first end face/aperture of the second end face) is desirably about 3.0 or less, and more desirably about 2.5 or less.

In the honeycomb structure 20 according to the embodiments of the present invention, each of the cell walls 213, 223, and 233 except the peripheral walls of the honeycomb fired bodies 210, 220, and 230 has a thickness of about 0.1 mm or more, and less than about 0.2 mm. Each of the cell walls except the peripheral walls of the honeycomb fired bodies desirably has a thickness of from about 0.150 mm to about 0.195 mm.

The cell walls 213, 223, and 233 include: cell walls 213a, 223a, and 233a that partition the large volume cells 211a, 221a, and 231a and the small volume cells 211b, 221b, and 231b; and cell walls 213b, 223b, and 233b that partition the large volume cells 211a, 221a, and 231a. The cell walls 213a, 223a, and 233a and the cell walls 213b, 223b, and 233b desirably have substantially the same thickness. In addition, the cell walls 213, 223, and 233 more desirably have a thickness of from about 0.150 mm to about 0.195 mm.

In the honeycomb structure 20 according to the embodiment of the present invention, the diameter of the honeycomb structure 20 is set to as large as about 200 mm or more, and the ratio of the length of the honeycomb structure 20 to the diameter of the honeycomb structure 20 (length of the honeycomb structure/diameter of the honeycomb structure) is set to about 1.0 or less.

In the honeycomb structure 20 according to the embodiments of the present invention, the ratio of the length of the honeycomb structure 20 to the diameter of the honeycomb structure 20 is desirably about 0.5 or more, and more desirably about 0.6 or more.

In addition, the diameter of the honeycomb structure 20 is desirably about 450 mm or less, and more desirably about 400 mm or less.

The peripheral walls 214, 228, and 238 of the honeycomb fired bodies 210, 220, and 230 in the honeycomb structure 20 according to the embodiments of the present invention desirably have a thickness of from about 0.2 mm to about 0.5 mm.

In the honeycomb structure 20 according to the embodiments of the present invention, the number of cells per unit area in a cross section perpendicular to the longitudinal direction of the honeycomb fired bodies 210, 220, and 230 is desirably from about 31 pcs/cm$^2$ to about 62 pcs/cm$^2$ (from about 200 pcs/inch$^2$ to about 400 pcs/inch$^2$), and more desirably from about 38 pcs/cm$^2$ to about 55 pcs/cm$^2$ (from about 250 pcs/inch$^2$ to about 350 pcs/inch$^2$).

Next, a method for manufacturing a honeycomb structure according to the second embodiment of the present invention will be described.

(1) A honeycomb molded body is first manufactured. The honeycomb molded body is manufactured as in the first embodiment of the present invention, except that a die for manufacturing honeycomb fired bodies 220 and 230 is different from the die in the first embodiment of the present invention.

Subsequently, a honeycomb fired body is manufactured by cutting, drying, plugging, degreasing, and then firing the honeycomb molded body by the same method described in the methods (2) and (3) for manufacturing the honeycomb structure according to the first embodiment of the present invention.

(4) Next, an adhesive paste layer is formed on necessary portions of side faces of the honeycomb fired bodies 210, 220, and 230, and the honeycomb fired bodies are bonded to one another. Then, the adhesive paste layers are heated and solidified to form adhesive layers, whereby a ceramic block in which multiple honeycomb fired bodies are combined by interposing an adhesive layer is formed (combining process).

Here, the adhesive paste suitably contains, for example, an inorganic fiber and/or whisker, inorganic particles, an inorganic binder, and an organic binder.

In this combining process, the honeycomb fired bodies 210 are disposed in the central part, the honeycomb fired bodies 220 and the honeycomb fired bodies 230 are disposed around the honeycomb fired bodies 210 to manufacture a ceramic block having a cross-sectional shape illustrated in FIG. 9.

In particular, the honeycomb fired bodies 220 are disposed so that the second sides 225 thereof are adjacent to the honeycomb fired bodies 210 and the inclined sides 226 thereof correspond to the outermost periphery of the ceramic block 23.

In addition, the honeycomb fired bodies 230 are disposed so that the first sides 234 and the second sides 235 thereof are adjacent to the honeycomb fired bodies 210 and the inclined sides 236 thereof correspond to the outermost periphery of the ceramic block 23.

In the honeycomb structure 20 according to the second embodiment of the present invention, peripheral walls 214, 228, and 238 are formed in all the peripheral parts of the honeycomb fired bodies 210, 220, and 230, and a substantially round pillar shape is formed at the time when the ceramic block 23 is manufactured; thus, cutting is not necessary.

(5) Subsequently, as in the first embodiment of the present invention, a peripheral coating material paste is applied to the peripheral face of the ceramic block 23, and is dried and solidified to form a peripheral coat layer (peripheral coat layer forming process). Thereby, a honeycomb structure according to the second embodiment of the present invention can be manufactured.

The honeycomb structure according to the second embodiment of the present invention exerts the same effects as the effects (1) to (9) described in the honeycomb structure according to the first embodiment of the present invention.

(Embodiment of Exhaust Gas Purifying Apparatus)

An exhaust gas purifying apparatus according to the embodiments of the present invention includes
a honeycomb structure,
a holding sealing material disposed on a side face of the honeycomb structure, and
a metal container,
the honeycomb structure and the holding sealing material being disposed in the metal container. The honeycomb structure is the honeycomb structure having the above configuration according to the embodiments of the present invention, and is disposed so that an exhaust gas inlet side of corresponds to a first end face of the honeycomb structure.

Figure 14:
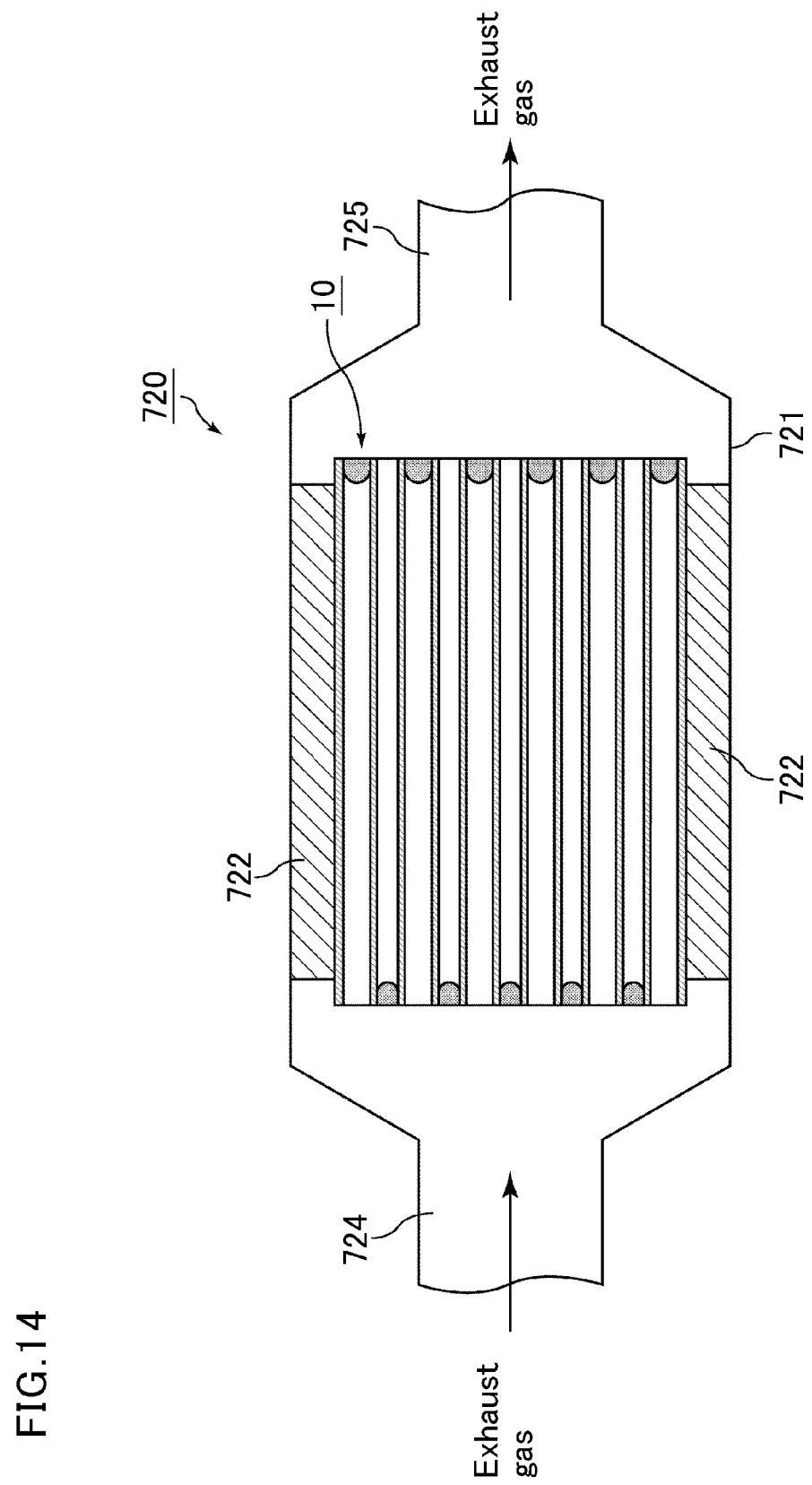
FIG. 14 is a cross-sectional view schematically illustrating an exhaust gas purifying apparatus according to the embodiment of the present invention.

FIG. 14 is a cross-sectional view schematically illustrating an exhaust gas purifying apparatus according to the embodiments of the present invention.

As illustrated in FIG. 14, an exhaust gas purifying apparatus 720 according to the embodiments of the present invention includes a honeycomb structure 10, a metal container 721 that covers the honeycomb structure 10, and a holding sealing material 722 disposed between the honeycomb structure 10 and the metal container 721. An introducing pipe 724 coupled with internal combustion engines such as engines is connected to the end portion in which exhaust gas of the metal container 721 is introduced, and an exhaust pipe 725 is connected to the other end portion of the metal container 721. The arrow shows the flow of exhaust gas in FIG. 14.

That is, in the exhaust gas purifying apparatus 720, the holding sealing material 722 is disposed on a side face of the honeycomb structure 10, and the honeycomb structure 10 and the holding sealing material 722 are disposed in the metal container 721.

The honeycomb structure 10 is the honeycomb structure 10 according to the first embodiment of the present invention. The first end face (end face with the large volume cells open) of the honeycomb structure 10 is disposed on the exhaust gas inlet side to which the introducing pipe 724 of the exhaust gas purifying apparatus 720 is connected, and the second end face (end face with the small volume cells open) is disposed on the exhaust gas outlet side to which the exhaust pipe 725 is connected.

The holding sealing material 722 has a mat shape and includes inorganic fibers made of alumina-silica. The holding sealing material 722 is interposed between the honeycomb structure 10 and the metal container 721 so as to prevent the honeycomb structure 10 from coming into contact with the metal container 721 and being damaged due to vibration, shock, or the like produced by travel of a vehicle and the like, and prevent exhaust gas from leaking between the honeycomb structure 10 and the metal container 721.

The honeycomb structure according to the present embodiment may be the honeycomb structure 20 according to the second embodiment of the present invention.

In the exhaust gas purifying apparatus 720 according to the embodiments of the present invention, since the honeycomb structure 10 is provided in the exhaust gas purifying apparatus 720 in the above-mentioned mode, the effects described below can be exerted.

Hereinafter, the effects of the exhaust gas purifying apparatus according to the embodiments of the present invention are listed.

(1) Since the aperture in a cross section perpendicular to the longitudinal direction in the central part of the honeycomb structure in the exhaust gas purifying apparatus according to the present embodiment is as high as about 65% or more, the (initial) pressure loss before PM deposition is more likely to be reduced.

(2) The ratio of the aperture of the honeycomb structure in the exhaust gas purifying apparatus according to the present embodiment (aperture of the first end face/aperture of the second end face) is about 1.4 or more, and a cell wall has a thin thickness of about 0.1 mm or more, and less than about 0.2 mm. Thus, the filtration area of the honeycomb structure tends to be large. Therefore, the filtration area of the cell wall of the honeycomb structure tends to be large relative to inlet exhaust gas. For this reason, in the exhaust gas purifying apparatus of the present embodiment, the initial pressure loss is more likely to be reduced.

(3) The honeycomb structure in the exhaust gas purifying apparatus of the present embodiment has a diameter of about 200 mm or more, and the ratio of the length to the diameter of the honeycomb structure (length of the honeycomb structure/ diameter of the honeycomb structure) is about 1.0 or less. That is, the honeycomb structure is a large honeycomb structure used for large vehicles or the like, the diameter of the honeycomb structure is large, and the length of the honeycomb structure is shorter than the diameter of the honeycomb structure. Therefore, the area of the end face of the honeycomb structure is large, and the length of the cell is short. Consequently, the increase in pressure loss of the honeycomb structure caused by friction arising when exhaust gas passes through the cells of the honeycomb structure is more likely to be suppressed. In the case where the area of the end face of the honeycomb structure is large and the cell is short, the cell wall is thin, which makes it easier to suppress the increase in pressure loss of the honeycomb structure. In addition, contribution of the increase in pressure loss of the honeycomb structure is more likely to be reduced even if the flow speed of exhaust gases that pass through the cell wall is high. Further, PM tends to be substantially uniformly deposited on the entire cell of the honeycomb structure. Thus, since the length of the honeycomb structure is shorter than the diameter of the honeycomb structure, the pressure loss of the honeycomb structure is more likely to be reduced. Therefore, the volume of the honeycomb structure provided in the exhaust gas purifying apparatus is more likely to be reduced. In the case where the honeycomb structure is used for large vehicles or the like, continuous regeneration (removal of PM) of the honeycomb structure is more likely to be performed. Accordingly, it is unnecessary to deposit a large amount of PM on the honeycomb structure.

(4) The aperture in a cross section perpendicular to the longitudinal direction in the central part of the honeycomb structure in the exhaust gas purifying apparatus of the present embodiment is desirably about 80% or less. When the aperture in a cross section perpendicular to the longitudinal direction in the central part of the honeycomb structure is about 80% or less, the number of the cells present per unit area of the honeycomb structure is more likely to be set to a suitable number (for example, from about 31 pcs/cm$^2$ to about 62 pcs/cm$^2$). Accordingly, the cell wall tends to function as a wall supporting the honeycomb structure, and the mechanical strength of the honeycomb structure is more likely to be maintained within a suitable range. Thus, it may become easier to manufacture an exhaust gas purifying apparatus that tends not to cause cracks in the honeycomb structure over long periods of use and excels in durability.

(5) The ratio of the aperture of the honeycomb structure in the exhaust gas purifying apparatus according to the present embodiment (aperture of the first end face/aperture of the second end face) is desirably about 3.0 or less. When the ratio of the aperture (aperture of the first end face/aperture of the second end face) is about 3.0 or less, it may become easier to suppress the increase in pressure loss of the exhaust gas purifying apparatus resulting from too high a ratio of the aperture of the first end face of the honeycomb structure to the aperture of the second end face thereof.

(6) The ratio of the length to the diameter of the honeycomb structure of the present embodiment (length of the honeycomb structure/diameter of the honeycomb structure) is desirably about 0.5 or more.

When the ratio of the length to the diameter of the honeycomb structure is too low, less than about 0.5, exhaust gases that have flowed into the honeycomb structure tends to flow backward. Therefore, PM is more likely to be accumulated only on the exhaust gas outlet side of the honeycomb structure. As a result, the pressure loss of the honeycomb structure tends to increase. However, when the ratio of the length to the diameter of the honeycomb structure is about 0.5 or more, exhaust gases that have flowed into the honeycomb structure tend not to flow into the outlet side. Therefore, PM tends to be substantially uniformly deposited on the cell walls of the honeycomb structure. As a result, it may become easier to manufacture an exhaust gas purifying apparatus that tends not to increase pressure loss.

(7) The peripheral wall of the honeycomb fired body in the honeycomb structure provided in the exhaust gas purifying apparatus according to the present embodiment desirably has a thickness of from about 0.2 mm to about 0.5 mm. When the peripheral wall of the honeycomb fired body has a thickness of from about 0.2 mm to about 0.5 mm, the peripheral wall is thicker than the cell wall of the honeycomb structure. Therefore, even if the cell wall of the honeycomb fired body is thin, the peripheral wall of the honeycomb fired body tends to function as a reinforcing material for maintaining mechanical strength, and mechanical properties of the honeycomb fired body provided in the exhaust gas purifying apparatus are more likely to be favorably maintained. Thus, it may become easier to manufacture an exhaust gas purifying apparatus that tends not to cause cracks in the honeycomb structure over long periods of use and excels in durability.

(8) The number of cells per unit area in a cross section perpendicular to the longitudinal direction of the honeycomb fired body in the honeycomb structure provided in the exhaust gas purifying apparatus of the present embodiment is desirably from about 31 pcs/cm$^2$ to about 62 pcs/cm$^2$. If the number of cells per unit area in a cross section perpendicular to the longitudinal direction of the honeycomb fired body is from about 31 pcs/cm$^2$ to about 62 pcs/cm$^2$, the number (area) of the cell walls per unit area in the cross section of the honeycomb structure tends to be within a suitable range, the cell wall tends to function as a site for maintaining mechanical properties of the honeycomb fired body, and the honeycomb structure tends to maintain mechanical properties. Thus, it may become easier to manufacture an exhaust gas purifying apparatus that tends not to cause cracks in the honeycomb structure even after long-term use and excels in durability.

Other Embodiments

In the honeycomb structure according to the first embodiment of the present invention, outer honeycomb fired bodies 120 and 130 have no peripheral wall in the cut portion. Therefore, the large volume cells 111a and the small volume cells 111b are exposed to a peripheral part as a groove. However, the outer honeycomb fired body may be used in a mode in which the peripheral wall is formed in the entire periphery.

Figure 10A:
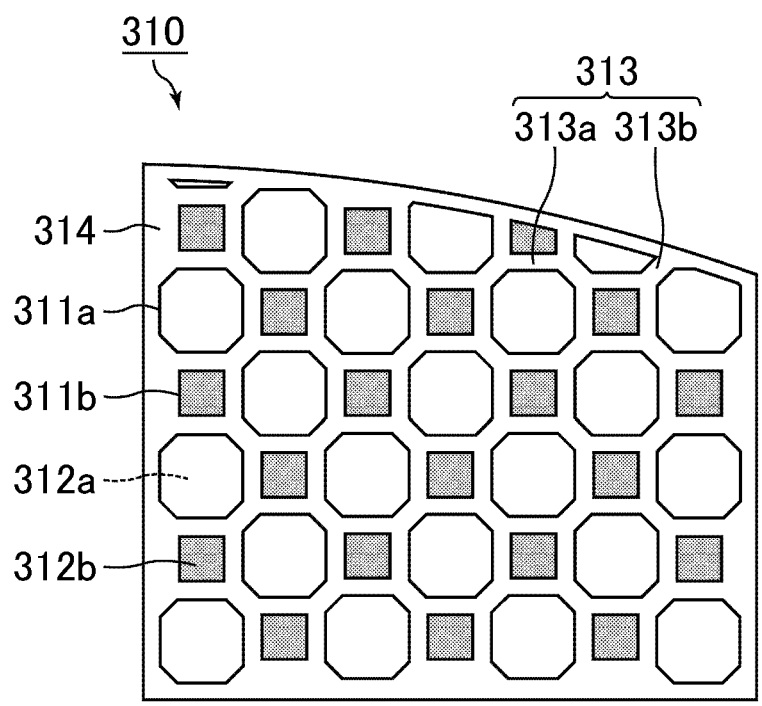
FIG. 10A and FIG. 10B are side views each schematically illustrating one example of an outer honeycomb fired body in the honeycomb structure according to another embodiment of the present invention.
Figure 10B:
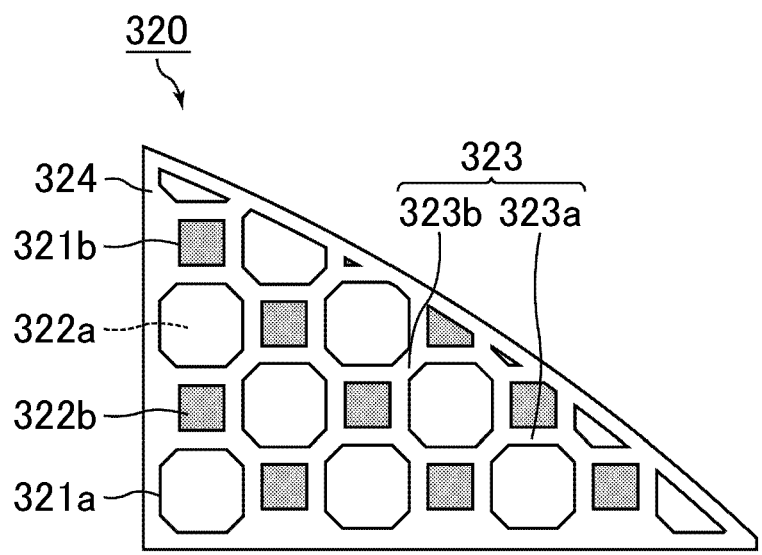

Specifically, the honeycomb structure according to the embodiments of the present invention may include inner honeycomb fired bodies 110 illustrated in FIG. 2A and FIG. 2B, outer honeycomb fired bodies 310 illustrated in FIG. 10A, and outer honeycomb fired bodies 320 illustrated in FIG. 10B.

FIG. 10A and FIG. 10B are side views each schematically illustrating one example of an outer honeycomb fired body in the honeycomb structure according to another embodiment of the present invention.

The outer honeycomb fired body 310 illustrated in FIG. 10A and the outer honeycomb fired body 320 illustrated in FIG. 10B are modifications of the outer honeycomb fired body 120 illustrated in FIG. 3A and the outer honeycomb fired body 130 illustrated in FIG. 3B, respectively.

The outer honeycomb fired body 310 illustrated in FIG. 10A and the outer honeycomb fired body 320 illustrated in FIG. 10B have the same configurations as the honeycomb fired bodies 120 and 130 illustrated in FIG. 3A and FIG. 3B, respectively. The large volume cells 311a and 321a and the small volume cells 311b and 321b have the same shapes as in the honeycomb fired bodies 120 and 130 illustrated in FIG. 3A and FIG. 3B, respectively.

Peripheral walls 314 and 324 each having a predetermined thickness are formed on a side having a substantially arc shape, and large volume cells 311a and 321a and small volume cells 311b and 321b in the vicinity of the peripheral walls 314 and 324 are modified with the peripheral walls 314 and 324.

The honeycomb structure having such honeycomb fired bodies 310 and 320, as well as the honeycomb structure 20 according to the second embodiment of the present invention, has a substantially round pillar shape at the time when a ceramic block is manufactured. Therefore, cutting is not necessary, and the process of manufacturing the ceramic block is more likely to be simplified.

In order to manufacture a honeycomb structure having the above configuration, a honeycomb molded body may be prepared with a die that corresponds to the inner honeycomb fired body 110 illustrated in FIG. 2A and FIG. 2B, the outer honeycomb fired body 310 illustrated in FIG. 10A, and the outer honeycomb fired body 320 illustrated in FIG. 10B.

The honeycomb fired body in the honeycomb structure according to the embodiments of the present invention is composed of large volume cells and small volume cells. The configurations of the large volume cells and the small volume cells are not limited to the configurations described in the preceding embodiments.

The following will describe the case where large volume cells and small volume cells have different shapes in the honeycomb fired bodies having the same shapes as those of multiple honeycomb fired bodies in the honeycomb structure according to the second embodiment of the present invention. The shape of the honeycomb structure or the honeycomb fired body in the honeycomb structure is not limited to the shape of the honeycomb structure or the honeycomb fired body in the honeycomb structure according to the second embodiment of the present invention.

Figure 11A:
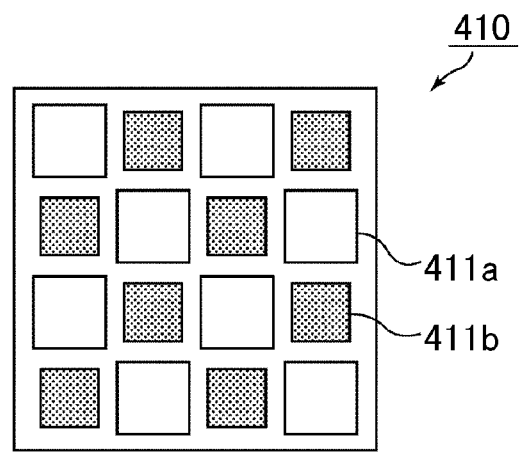
FIG. 11A, FIG. 11B, and FIG. 11C are side views each schematically illustrating one example of a honeycomb fired body in the honeycomb structure according to another embodiment of the present invention.
Figure 11B:
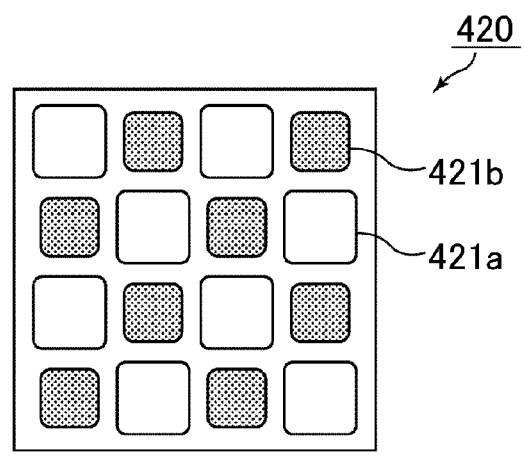
Figure 11C:
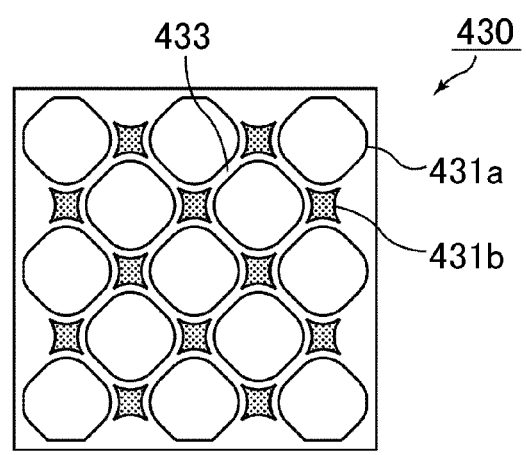

FIG. 11A, FIG. 11B, and FIG. 11C are side views each schematically illustrating one example of an inner honeycomb fired body in a honeycomb structure according to another embodiment of the present invention.

In a honeycomb fired body 410 illustrated in FIG. 11A, a large volume cell 411a and a small volume cell 411b are alternately provided.

In the inner honeycomb fired body 410 illustrated in FIG. 11A, each of the large volume cells 411a has a substantially quadrangle shape in a cross section perpendicular to the longitudinal direction, and each of the small volume cells 411b has a substantially quadrangle shape in a cross section perpendicular to the longitudinal direction.

In a honeycomb fired body 420 illustrated in FIG. 11B, a large volume cell 421a and a small volume cell 421b are alternately provided.

In the honeycomb fired body 420 illustrated in FIG. 11B, the shape of a large volume cell 421a in a cross section perpendicular to the longitudinal direction is a substantially quadrangle in which portions corresponding to corner portions are substantially arcs, and the shape of a small volume cell 421b in a cross section perpendicular to the longitudinal direction is a substantially quadrangle in which portions corresponding to corner portions are substantially arcs.

In a honeycomb fired body 430 illustrated in FIG. 11C, a large volume cell 431a and a small volume cell 431b are alternately provided. Each side in each of the large volume cells 431a and the small volume cells 431b has a shape formed by a curve line in a cross section perpendicular to the longitudinal direction. Namely, the cross-sectional shapes of cell walls 433 are formed by curve lines in FIG. 11C.

The large volume cells 431a have cross-sectional shapes in which cell walls 433 project from the center toward the outside of the cell cross section. In contrast, the small volume cells 431b have cross-sectional shapes in which cell walls 433 project from the outside toward the center of the cross section of the cell.

The cell walls 433 have "wave" shapes undulating horizontally and vertically in a cross section of the honeycomb fired body. The tops of the waves of the adjacent cell walls 433 (maximum amplitude of sinusoid) are most proximate to each other so that the large volume cells 431a having a cross-sectional shape expanding outwardly and the small volume cells 431b recessing inwardly may be formed. The amplitude of the waves may or may not be substantially constant. In particular, substantially constant waves are desirable.

The shapes of the large volume cells and the small volume cells may be shapes other than the above shapes.

In the case where the honeycomb fired body has large volume cells and small volume cells, the distance between the centers of gravity of adjacent large volume cells in a cross section perpendicular to the longitudinal direction is desirably substantially equal to the distance between the centers of gravity of adjacent small volume cells in a cross section perpendicular to the longitudinal direction. The expression "the distance between the centers of gravity of adjacent large volume cells in a cross section perpendicular to the longitudinal direction" used herein refers to the minimum distance between the center of gravity of one large volume cell in a section perpendicular to the longitudinal direction and the center of gravity of an adjacent large volume cell. In contrast, the expression "the distance between the centers of gravity of adjacent small volume cells in a cross section perpendicular to the longitudinal direction" used herein refers to the minimum distance between the center of gravity of one small volume cell in a section perpendicular to the longitudinal direction and the center of gravity of an adjacent small volume cell.

If two distances between the centers of gravity are substantially equal, heat tends to be substantially uniformly spread upon regeneration. Accordingly, the honeycomb filter tends to have no local bias in the temperature inside and does not tend to have cracks resulting from thermal stress and the like even after long-term repetitive use. As a result, a honeycomb filter with excellent durability can be provided.

Regarding a honeycomb fired body including large volume cells and small volume cells, a honeycomb fired body illustrated in FIG. 2A and FIG. 2B having a substantially quadrangle shape in a cross section perpendicular to the longitudinal direction has been described as an example. The honeycomb fired body 220 illustrated in FIG. 7 or the honeycomb fired body 230 illustrated in FIG. 8 may include large volume cells and small volume cells having shapes different from those illustrated in FIG. 6 to FIG. 8.

Figure 12A:
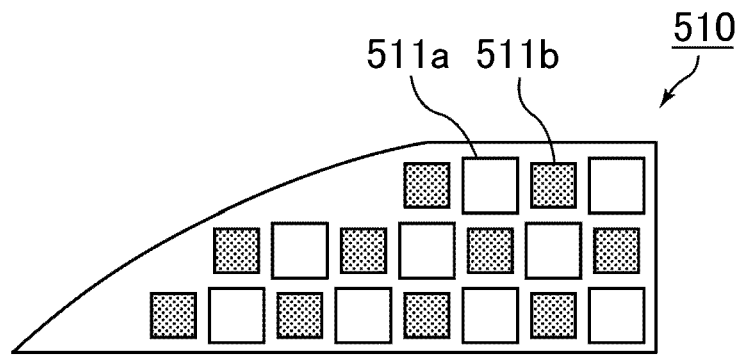
FIG. 12A, FIG. 12B, and FIG. 12C are side views each schematically illustrating one example of an end face of a honeycomb fired body having another configuration in the honeycomb structure according to another embodiment of the present invention.
Figure 12B:
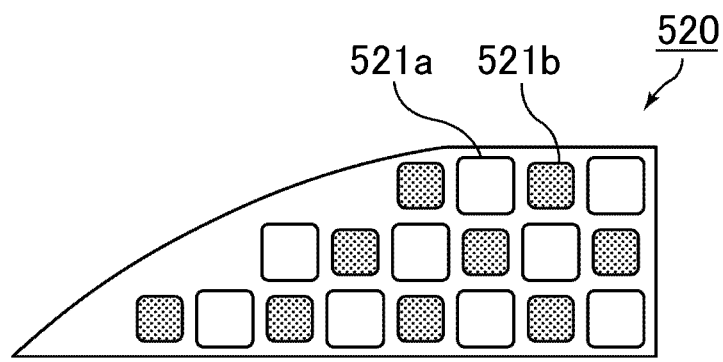
Figure 12C:
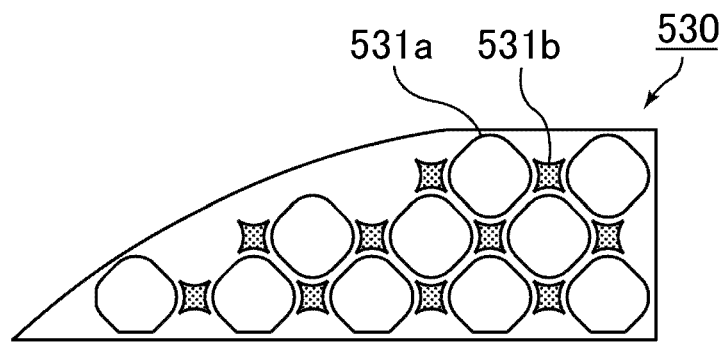

FIG. 12A, FIG. 12B, and FIG. 12C are side views each schematically illustrating one example of an end face of a honeycomb fired body having another configuration in a honeycomb structure according to another embodiment of the present invention. The honeycomb fired bodies illustrated in FIG. 12A, FIG. 12B, and FIG. 12C have the same shapes as that of the honeycomb fired body 220 illustrated in FIG. 7.

In honeycomb fired bodies 510, 520, and 530 illustrated in FIG. 12A, FIG. 12B, and FIG, large volume cells 511a, 521a, and 531a and small volume cell 511b, 521b, and 531b, respectively, are alternately provided. The large volume cells and the small volume cells have the same shapes as in the above honeycomb fired bodies 410, 420, and 430, and therefore the detailed description thereof is omitted.

Figure 13A:
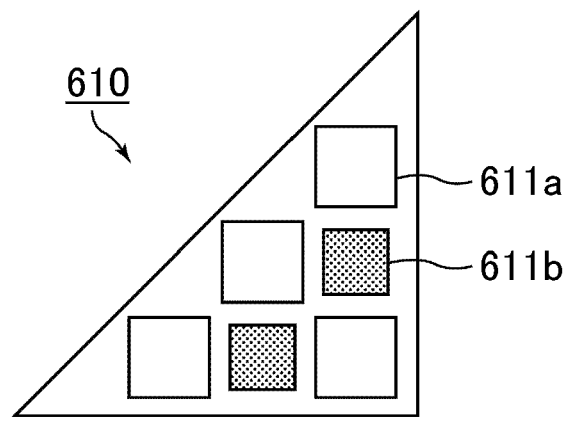
FIG. 13A, FIG. 13B, and FIG. 13C are side views each schematically illustrating one example of an end face of a honeycomb fired body having another configuration in the honeycomb structure according to another embodiment of the present invention.
Figure 13B:
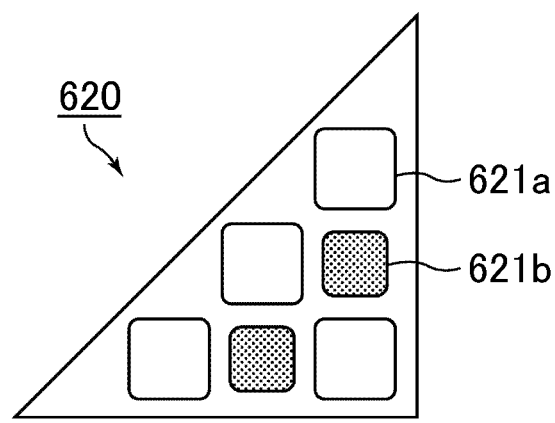
Figure 13C:
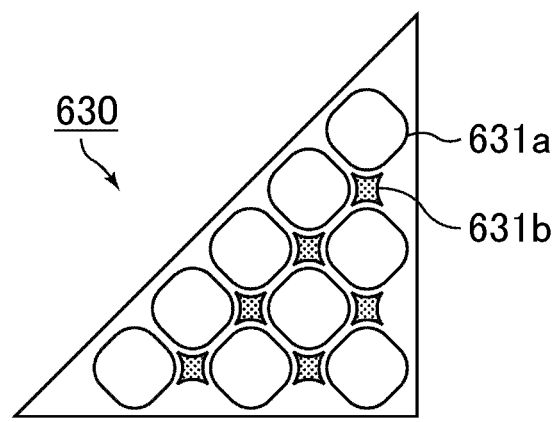

FIG. 13A, FIG. 13B, and FIG. 13C are side views each schematically illustrating one example of an end face of a honeycomb fired body having another configuration in a honeycomb structure according to another embodiment of the present invention. The honeycomb fired bodies illustrated in FIG. 13A, FIG. 13B, and FIG. 13C have the same shapes as that of the honeycomb fired body 230 illustrated in FIG. 8.

In honeycomb fired bodies 610, 620, and 630 illustrated in FIG. 13A, FIG. 13B, and FIG. 13C, large volume cells 611a, 621a, and 631a and small volume cell 611b, 621b, and 631b, respectively, are alternately provided. The large volume cells and the small volume cells have the same shapes as in the above honeycomb fired bodies 410, 420, and 430, and therefore the detailed description thereof is omitted.

The shape of the honeycomb structure according to the embodiments of the present invention is not especially limited to a substantially round pillar shape, and may be any pillar shape such as a substantially cylindroid shape, a substantially pillar shape with a racetrack end face, a substantially polygonal pillar shape, and a pillar shape in which the corner of the cross-sectional substantially triangle is a substantially arc.

In the honeycomb structure according to the embodiments of the present invention, the end portion of the cells does not have to be plugged with a plug material provided in the cells. In this case, a catalyst is supported on the cell walls so that the honeycomb structure functions as a catalyst supporting carrier for converting toxic gas components such as CO, HC, NOx or the like in exhaust gases.

In the honeycomb structure according to the embodiments of the present invention used as a filter, the porosity of the honeycomb fired body included in the honeycomb structure is not particularly limited and is desirably in a range from about 35% to about 60%.

A porosity of the honeycomb fired body of about 35% or more tends not to cause clogging of the honeycomb fired body. In contrast, a porosity of the honeycomb fired body of about 60% or less tends not to lower the strength of the honeycomb fired body, leading not to easy breakage of the honeycomb fired body.

In the honeycomb structure according to the embodiments of the present invention used as a filter, the honeycomb fired body included in the honeycomb structure desirably has an average pore size of from about 5 µm to about 30 µm.

An average pore size of the honeycomb fired body of about 5 µm or more tends not to cause clogging of the honeycomb fired body. In contrast, an average pore size of the honeycomb fired body of about 30 µm or less allows particulates not to pass through the pores of the honeycomb fired body. In such a case, the honeycomb fired body surely captures particulates, and the honeycomb structure functions as a filter.

The porosity and the pore size can be measured by the conventionally known methods such as mercury porosimetry.

In the honeycomb structure according to the embodiments of the present invention, the shape of each cell in the honeycomb fired body in a cross section perpendicular to the longitudinal direction of the honeycomb fired body is not particularly limited, and may be any shape such as a substantially quadrangle shape and a substantially hexagonal shape. Or alternatively, various shapes of cells may be present in combination.

The material of the honeycomb fired body included in the honeycomb structure according to the embodiments of the present invention is not limited to silicon carbide or silicon-bonded silicon carbide. Examples thereof include: ceramic nitrides such as aluminum nitride, silicon nitride, boron nitride, and titanium nitride; ceramic carbides such as zirconium carbide, titanium carbide, tantalum carbide, and tungsten carbide; and ceramic oxides such as cordierite and aluminium titanate.

Among these, non-oxide ceramics are desirable and silicon carbide or silicon-bonded silicon carbide is particularly desirable because of its excellent heat resistance, mechanical strength, thermal conductivity, and the like.

The organic binder in the wet mixture used for manufacturing the honeycomb fired body included in the honeycomb structure according to the embodiments of the present invention is not particularly limited. Examples thereof include methylcellulose, carboxy methylcellulose, hydroxy ethylcellulose, polyethylene glycol, and the like. Methylcellulose is desirable among these. A blending amount of the organic binder is usually desirably in a range from about 1 part by weight to about 10 parts by weight relative to 100 parts by weight of the ceramic powder.

The plasticizer in the wet mixture is not particularly limited, and examples thereof include glycerin and the like.

The lubricant in the wet mixture is not particularly limited, and examples thereof include polyoxyalkylene-based compounds such as polyoxyethylene alkyl ether and polyoxypropylene alkyl ether.

Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture. Examples of the dispersant solution include water, an organic solvent such as benzene, alcohol such as methanol, and the like.

Furthermore, a molding aid may be added to the wet mixture.

The molding aid is not particularly limited, and examples thereof include ethylene glycol, dextrin, fatty acid, fatty acid soap, polyalcohol, and the like.

Furthermore, a pore-forming agent such as balloons that are fine hollow spheres including oxide-based ceramics, spherical acrylic particles, and graphite may be added to the wet mixture, if necessary.

The balloons are not particularly limited, and examples thereof include alumina balloon, glass micro balloon, shirasu balloon, fly ash balloon (FA balloon), mullite balloon, and the like. Alumina balloon is desirable among these.

Examples of the inorganic binder in the adhesive paste and the peripheral coating material paste include silica sol, alumina sol, and the like. Each of these materials may be used alone, or two or more of these may be used in combination. Silica sol is desirable among the inorganic binders.

Example of the organic binder in the adhesive paste and the peripheral coating material paste include polyvinyl alcohol, methyl cellulose, ethyl cellulose, carboxymethyl cellulose, and the like. Each of these materials may be used alone, or two or more of these may be used in combination. Carboxymethyl cellulose is desirable among the organic binders.

Examples of the inorganic particles in the adhesive paste and the peripheral coating material paste include carbide particles, nitride particles, and the like. Specific examples thereof include inorganic particles made from silicon carbide, silicon nitride, boron nitride, and the like. Each of these may be used alone, or two or more of these may be used in combination. Among the inorganic particles, silicon carbide particles are desirable due to their superior thermal conductivity.

Examples of the inorganic fibers and/or whisker in the adhesive paste and the peripheral coating material paste include inorganic fibers and/or whisker made from silica-alumina, mullite, alumina, silica, and the like. Each of these may be used alone or two or more kinds of these may be used in combination. Alumina fibers are desirable among the inorganic fibers. The inorganic fibers may be biosoluble fibers.

Furthermore, a pore-forming agent such as balloons that are fine hollow spheres including oxide-based ceramics, spherical acrylic particles, and graphite may be added to the adhesive paste and the peripheral coating material paste, if necessary. The balloons are not particularly limited, and examples thereof include alumina balloon, glass micro balloon, shirasu balloon, fly ash balloon (FA balloon), mullite balloon, and the like. Alumina balloon is desirable among these.

A catalyst for converting exhaust gases may be supported on the cell walls of the honeycomb fired body in the honeycomb structure according to the embodiments of the present invention. Desirable examples of the catalyst include noble metals such as platinum, palladium, and rhodium. Other examples of the catalyst include alkali metals such as potassium and sodium, alkaline earth metals such as barium, and zeolite. Each of these catalysts may be used alone, or two or more of these may be used in combination.

The honeycomb structure according to the embodiments of the present invention includes the following essential features. That is, the honeycomb structure includes: a ceramic block in which multiple honeycomb fired bodies are combined with one another by interposing an adhesive layer, each of the multiple honeycomb fired bodies including large volume cells and small volume cells, each of the large volume cells being larger than each of the small volume cells in a cross section perpendicular to the longitudinal direction, wherein either one end portion of each of the large volume cells and the small volume cells is plugged, an aperture in a cross section perpendicular to the longitudinal direction in a central part of the honeycomb structure is about 65% or more, a ratio of an aperture of a first end face of the honeycomb structure to an aperture of the second end face of the honeycomb structure (aperture of the first end face/aperture of the second end face) is about 1.4 or more, a cell wall except a peripheral wall of the honeycomb fired body has a thickness of about 0.1 mm or more, and less than about 0.2 mm, the honeycomb structure has a diameter of about 200 mm or more, and a ratio of a length of the honeycomb structure to the diameter of the honeycomb structure (length of the honeycomb structure/diameter of the honeycomb structure) is about 1.0 or less.

Desired effects are more likely to be exerted when such essential features are appropriately combined with various configurations described in detail in the first and second embodiments and other embodiments of the present invention (for example, the shape of the honeycomb fired body in the honeycomb structure, the shape of the cell wall in the honey comb fired body, the cell structure of the honeycomb fired body, and the process for manufacturing the honeycomb structure).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure, comprising:
   a ceramic block including a plurality of honeycomb fired bodies, each of the plurality of honeycomb fired bodies having a peripheral wall and being combined with one another by interposing an adhesive layer;
   each of the plurality of honeycomb fired bodies including large volume cells and small volume cells which have cell walls; and each of the large volume cells being larger than each of the small volume cells in a cross section perpendicular to a longitudinal direction of the honeycomb structure,
wherein
each of the large volume cells and the small volume cells has end portions in the longitudinal direction and either one of the end portions of each of the large volume cells and the small volume cells is plugged,
an aperture in the cross section perpendicular to the longitudinal direction in a central part of the honeycomb structure is about 65% or more,
the honeycomb structure has a first end face and a second end face in the longitudinal direction and a ratio of an aperture of the first end face of the honeycomb structure to an aperture of the second end face of the honeycomb structure (aperture of the first end face/aperture of the second end face) is about 1.4 or more,
each of the cell walls except the peripheral walls of the plurality of honeycomb fired bodies has a thickness of about 0.1 mm or more, and less than about 0.2 mm,
the honeycomb structure has a diameter of about 200 mm or more, and
a ratio of a length of the honeycomb structure to the diameter of the honeycomb structure (length of the honeycomb structure/diameter of the honeycomb structure) is about 1.0 or less.

2. The honeycomb structure according to claim 1, wherein
the aperture in the cross section perpendicular to the longitudinal direction in the central part of the honeycomb structure is about 80% or less.

3. The honeycomb structure according to claim 2, wherein
the aperture in the cross section perpendicular to the longitudinal direction in the central part of the honeycomb structure is about 78% or less.

4. The honeycomb structure according to claim 1, wherein
the ratio of the aperture of the first end face of the honeycomb structure to the aperture of the second end face of the honeycomb structure (aperture of the first end face/aperture of the second end face) is about 3.0 or less.

5. The honeycomb structure according to claim 4, wherein
the ratio of the aperture of the first end face of the honeycomb structure to the aperture of the second end face of the honeycomb structure (aperture of the first end face/aperture of the second end face) is about 2.5 or less.

6. The honeycomb structure according to claim 1, wherein
the ratio of the length of the honeycomb structure to the diameter of the honeycomb structure (length of the honeycomb structure/diameter of the honeycomb structure) is about 0.5 or more.

7. The honeycomb structure according to claim 6, wherein
the ratio of the length of the honeycomb structure to the diameter of the honeycomb structure (length of the honeycomb structure/diameter of the honeycomb structure) is about 0.6 or more.

8. The honeycomb structure according to claim 1, wherein
the peripheral wall has a thickness of from about 0.2 mm to about 0.5 mm in each of the plurality of honeycomb fired bodies.

9. The honeycomb structure according to claim 1, wherein
a number of cells per unit area in the cross section perpendicular to the longitudinal direction of the honeycomb structure is from about 31 pcs/cm$^2$ to about 62 pcs/cm$^2$.

10. The honeycomb structure according to claim 9, wherein
the number of cells per unit area in the cross section perpendicular to the longitudinal direction of the honeycomb structure is from about 38 pcs/cm$^2$ to about 55 pcs/cm$^2$.

11. The honeycomb structure according to claim 1, wherein
each of the large volume cells has a substantially octagonal shape in the cross section perpendicular to the longitudinal direction, and
each of the small volume cells has a substantially quadrangle shape in the cross section perpendicular to the longitudinal direction.

12. The honeycomb structure according to claim 1, wherein
each of the large volume cells has a substantially quadrangle shape in the cross section perpendicular to the longitudinal direction, and
each of the small volume cells has a substantially quadrangle shape in the cross section perpendicular to the longitudinal direction.

13. The honeycomb structure according to claim 1, wherein
each side in each of the large volume cells and the small volume cells has a shape formed by a curve line in the cross section perpendicular to the longitudinal direction.

14. The honeycomb structure according to claim 1, wherein
each of the plurality of honeycomb fired bodies has the peripheral wall in an entire periphery.

15. The honeycomb structure according to claim 1, wherein
a peripheral coat layer is provided on a periphery of the ceramic block.

16. The honeycomb structure according to claim 1, wherein
each of the plurality of honeycomb fired bodies has a porous body including silicon carbide or silicon-bonded silicon carbide.

17. The honeycomb structure according to claim 1, wherein
each of the cell walls except the peripheral walls of the plurality of honeycomb fired bodies has a thickness of from about 0.150 mm to about 0.195 mm.

18. The honeycomb structure according to claim 1, wherein
the diameter of the honeycomb structure is about 450 mm or less.

19. The honeycomb structure according to claim 1, wherein
each of the large volume cells and the small volume cells has a substantially arc shape on substantially square corners in the cross section perpendicular to the longitudinal direction.

20. The honeycomb structure according to claim 1, wherein
a catalyst is provided on the cell walls of each of the plurality of honeycomb fired bodies.

21. An exhaust gas purifying apparatus, comprising:
a honeycomb structure;
a holding sealing material disposed on a side face of the honeycomb structure; and
a metal container,
the honeycomb structure and the holding sealing material being disposed in the metal container,
the honeycomb structure, comprising:
a ceramic block including a plurality of honeycomb fired bodies, each of the plurality of honeycomb fired bodies having a peripheral wall and being combined with one another by interposing an adhesive layer;
each of the plurality of honeycomb fired bodies including large volume cells and small volume cells which have cell walls;
each of the large volume cells being larger than each of the small volume cells in a cross section perpendicular to a longitudinal direction of the honeycomb structure,
wherein
each of the large volume cells and the small volume cells has end portions in the longitudinal direction and either one of the end portions of each of the large volume cells and the small volume cells is plugged,
an aperture in the cross section perpendicular to the longitudinal direction in a central part of the honeycomb structure is about 65% or more,
the honeycomb structure has a first end face and a second end face in the longitudinal direction and a ratio of an aperture of the first end face of the honeycomb structure to an aperture of the second end face of the honeycomb structure (aperture of the first end face/aperture of the second end face) is about 1.4 or more,
each of the cell walls except the peripheral walls of the plurality of honeycomb fired bodies has a thickness of about 0.1 mm or more, and less than about 0.2 mm,
the honeycomb structure has a diameter of about 200 mm or more, and
a ratio of a length of the honeycomb structure to the diameter of the honeycomb structure (length of the honeycomb structure/diameter of the honeycomb structure) is about 1.0 or less; and
the honeycomb structure being disposed so that an exhaust gas inlet side corresponds to the first end face of the honeycomb structure.

22. The exhaust gas purifying apparatus according to claim 21,
wherein
the aperture in the cross section perpendicular to the longitudinal direction in the central part of the honeycomb structure is about 80% or less.

23. The exhaust gas purifying apparatus according to claim 22,
wherein
the aperture in the cross section perpendicular to the longitudinal direction in the central part of the honeycomb structure is about 78% or less.

24. The exhaust gas purifying apparatus according to claim 21,
wherein
the ratio of the aperture of the first end face of the honeycomb structure to the aperture of the second end face of the honeycomb structure (aperture of the first end face/aperture of the second end face) is about 3.0 or less.

25. The exhaust gas purifying apparatus according to claim 24,
wherein
the ratio of the aperture of the first end face of the honeycomb structure to the aperture of the second end face of the honeycomb structure (aperture of the first end face/aperture of the second end face) is about 2.5 or less.

26. The exhaust gas purifying apparatus according to claim 21,
wherein
the ratio of the length of the honeycomb structure to the diameter of the honeycomb structure (length of the honeycomb structure/diameter of the honeycomb structure) is about 0.5 or more.

27. The exhaust gas purifying apparatus according to claim 26,
wherein
the ratio of the length of the honeycomb structure to the diameter of the honeycomb structure (length of the honeycomb structure/diameter of the honeycomb structure) is about 0.6 or more.

28. The exhaust gas purifying apparatus according to claim 21,
wherein
the peripheral wall has a thickness of from about 0.2 mm to about 0.5 mm in each of the plurality of honeycomb fired bodies.

29. The exhaust gas purifying apparatus according to claim 21,
wherein
a number of cells per unit area in the cross section perpendicular to the longitudinal direction of the honeycomb structure is from about 31 pcs/cm$^2$ to about 62 pcs/cm$^2$.

30. The exhaust gas purifying apparatus according to claim 29,
wherein
the number of cells per unit area in the cross section perpendicular to the longitudinal direction of the honeycomb structure is from about 38 pcs/cm$^2$ to about 55 pcs/cm$^2$.

31. The exhaust gas purifying apparatus according to claim 21,
wherein
each of the large volume cells has a substantially octagonal shape in the cross section perpendicular to the longitudinal direction, and
each of the small volume cells has a substantially quadrangle shape in the cross section perpendicular to the longitudinal direction.

32. The exhaust gas purifying apparatus according to claim 21,
wherein
each of the large volume cells has a substantially quadrangle shape in the cross section perpendicular to the longitudinal direction, and
each of the small volume cells has a substantially quadrangle shape in the cross section perpendicular to the longitudinal direction.

33. The exhaust gas purifying apparatus according to claim 21,
wherein
each side in each of the large volume cells and the small volume cells has a shape formed by a curve line in the cross section perpendicular to the longitudinal direction.

34. The exhaust gas purifying apparatus according to claim 21,
wherein
each of the plurality of honeycomb fired bodies has the peripheral wall in an entire periphery.

35. The exhaust gas purifying apparatus according to claim 21,
wherein
a peripheral coat layer is provided on a periphery of the ceramic block.

36. The exhaust gas purifying apparatus according to claim 21,
wherein
each of the plurality of honeycomb fired bodies has a porous body including silicon carbide or silicon-bonded silicon carbide.

37. The exhaust gas purifying apparatus according to claim 21,
wherein
each of the cell walls except the peripheral walls of the plurality of honeycomb fired bodies has a thickness of from about 0.150 mm to about 0.195 mm.

38. The exhaust gas purifying apparatus according to claim 21,
wherein
the diameter of the honeycomb structure is from about 450 mm or less.

39. The exhaust gas purifying apparatus according to claim 21,
wherein
each of the large volume cells and the small volume cells has a substantially arc shape on substantially square corners in the cross section perpendicular to the longitudinal direction.

40. The exhaust gas purifying apparatus according to claim 21,
wherein
a catalyst is provided on the cell walls of each of the plurality of honeycomb fired bodies.

* * * * *